US012769550B1

(12) United States Patent
Favor et al.

(10) Patent No.: US 12,769,550 B1
(45) Date of Patent: Oct. 20, 2026

(54) PROCESSOR THAT MITIGATES SIDE CHANNEL ATTACKS BY REFRAINING FROM ALLOCATING AN ENTRY IN A DATA TLB FOR A MISSING LOAD ADDRESS WHEN THE LOAD ADDRESS MISSES BOTH IN A DATA CACHE MEMORY AND IN THE DATA TLB AND THE LOAD ADDRESS SPECIFIES A LOCATION WITHOUT A VALID ADDRESS TRANSLATION OR WITHOUT PERMISSION TO READ FROM THE LOCATION

(71) Applicant: Ventana Micro Systems Inc., Cupertino, CA (US)

(72) Inventors: John G. Favor, San Francisco, CA (US); Srivatsan Srinivasan, Cedar Park, TX (US)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 18/244,765

(22) Filed: Sep. 11, 2023

Related U.S. Application Data

(63) Continuation of application No. 17/064,553, filed on Oct. 6, 2020, now Pat. No. 11,853,424.

(51) Int. Cl.
*G06F 9/30* (2018.01)
*G06F 12/0811* (2016.01)
(Continued)

(52) U.S. Cl.
CPC ...... *G06F 9/30047* (2013.01); *G06F 9/30043* (2013.01); *G06F 12/0811* (2013.01);
(Continued)

(58) Field of Classification Search
CPC ............. G06F 9/30047; G06F 9/30043; G06F 12/0811; G06F 12/0895; G06F 12/1063; G06F 21/54; G06F 21/577; G06F 21/79
See application file for complete search history.

(56) References Cited

U.S. PATENT DOCUMENTS

| | | | |
|---|---|---|---|
| 4,742,451 | A | 5/1988 | Bruckert et al. |
| 5,371,855 | A | 12/1994 | Idleman et al. |

(Continued)

FOREIGN PATENT DOCUMENTS

| | | | |
|---|---|---|---|
| CN | 110232031 | A | 9/2019 |
| JP | 2021520545 | A | 8/2021 |

OTHER PUBLICATIONS

Hajinazar, Nastaran, et al. "The virtual block interface: A flexible alternative to the conventional virtual memory framework." 2020 ACM/IEEE 47th Annual International Symposium on Computer Architecture (ISCA). IEEE, 2020. (Year: 2020).*

(Continued)

*Primary Examiner* — Nicholas J Simonetti
(74) *Attorney, Agent, or Firm* — W&T

(57) ABSTRACT

A microprocessor for mitigating side channel attacks includes a memory subsystem that receives a load operation that specifies a load address. The memory subsystem includes a virtually-indexed, virtually-tagged data cache memory (VIVTDCM) comprising entries that hold translation information. The memory subsystem also includes a data translation lookaside buffer (DTLB) comprising entries that hold physical address translations and translation information. The processor performs speculative execution of instructions and executes instructions out of program order. The memory system allows non-inclusion with respect to translation information between the VIVTDCM and the DTLB such that, for instances in time, translation information associated with the load address is present in the (Continued)

VIVTDCM and absent in the DTLB. The memory subsystem uses the translation information of the VIVTDCM to complete execution of the load operation when the load address hits in the VIVTDCM irrespective of whether the translation information is present or absent in the DTLB.

16 Claims, 13 Drawing Sheets

(51) Int. Cl.
*G06F 12/0895* (2016.01)
*G06F 12/1045* (2016.01)
*G06F 21/54* (2013.01)
*G06F 21/57* (2013.01)
*G06F 21/79* (2013.01)

(52) U.S. Cl.
CPC ...... *G06F 12/0895* (2013.01); *G06F 12/1063* (2013.01); *G06F 21/54* (2013.01); *G06F 21/577* (2013.01); *G06F 21/79* (2013.01)

(56) References Cited

U.S. PATENT DOCUMENTS

| | | | | |
|---|---|---|---|---|
| 5,383,143 | A | 1/1995 | Crouch et al. | |
| 5,479,616 | A | 12/1995 | Garibay, Jr. et al. | |
| 5,561,774 | A | 10/1996 | Aikawa et al. | |
| 5,778,245 | A | 7/1998 | Papworth et al. | |
| 6,098,167 | A | 8/2000 | Cheong et al. | |
| 6,412,043 | B1 * | 6/2002 | Chopra | G06F 12/145 712/E9.032 |
| 7,711,763 | B2 | 5/2010 | Stribaek et al. | |
| 10,116,436 | B1 | 10/2018 | Kodalapura et al. | |
| 11,119,784 | B2 | 9/2021 | Branco et al. | |
| 11,176,055 | B1 | 11/2021 | Mukherjee et al. | |
| 11,579,884 | B2 | 2/2023 | Venkatachar et al. | |
| 11,593,504 | B1 | 2/2023 | Yates et al. | |
| 2004/0148468 | A1 | 7/2004 | Hooker | |
| 2007/0022348 | A1 | 1/2007 | Racunas et al. | |
| 2007/0028051 | A1 | 2/2007 | Williamson et al. | |
| 2007/0094475 | A1 * | 4/2007 | Bridges | G06F 12/1054 711/E12.063 |
| 2007/0244950 | A1 | 10/2007 | Golic | |
| 2008/0109614 | A1 * | 5/2008 | Begon | G06F 11/1008 712/E9.05 |
| 2008/0148282 | A1 | 6/2008 | Sodani et al. | |
| 2010/0199045 | A1 | 8/2010 | Bell et al. | |
| 2010/0281219 | A1 | 11/2010 | Lippert et al. | |
| 2012/0159103 | A1 | 6/2012 | Peinado et al. | |
| 2013/0067202 | A1 | 3/2013 | Henry et al. | |
| 2013/0151819 | A1 | 6/2013 | Piry et al. | |
| 2013/0185520 | A1 * | 7/2013 | Dieffenderfer | G06F 12/1045 711/144 |
| 2015/0089152 | A1 | 3/2015 | Busaba et al. | |
| 2015/0254189 | A1 | 9/2015 | Coppola et al. | |
| 2016/0140040 | A1 * | 5/2016 | Mukherjee | G06F 12/1027 711/135 |
| 2018/0089094 | A1 * | 3/2018 | Clancy | G06F 12/1063 |
| 2019/0004961 | A1 | 1/2019 | Boggs et al. | |
| 2019/0114422 | A1 | 4/2019 | Johnson et al. | |
| 2019/0138720 | A1 | 5/2019 | Grewal et al. | |
| 2019/0155733 | A1 * | 5/2019 | Hagersten | G06F 12/0806 |
| 2019/0266091 | A1 | 8/2019 | Robinson et al. | |
| 2019/0286821 | A1 | 9/2019 | Strogov et al. | |
| 2020/0089625 | A1 | 3/2020 | Wallach | |
| 2020/0133679 | A1 | 4/2020 | Brandt et al. | |
| 2020/0210070 | A1 | 7/2020 | Durham | |
| 2020/0250099 | A1 | 8/2020 | Campbell et al. | |
| 2021/0135882 | A1 | 5/2021 | Sun et al. | |
| 2021/0144517 | A1 | 5/2021 | Guim Bernat et al. | |
| 2021/0240619 | A1 * | 8/2021 | Earnshaw | G06F 12/145 |
| 2022/0067154 | A1 | 3/2022 | Favor et al. | |
| 2022/0067155 | A1 | 3/2022 | Favor et al. | |
| 2022/0067156 | A1 | 3/2022 | Favor et al. | |
| 2022/0107784 | A1 | 4/2022 | Favor et al. | |
| 2022/0108012 | A1 | 4/2022 | Favor et al. | |
| 2022/0108013 | A1 | 4/2022 | Favor et al. | |

OTHER PUBLICATIONS

Jang, Yeongjin, Sangho Lee, and Taesoo Kim. "Breaking kernel address space layout randomization with intel tsx." Proceedings of the 2016 ACM SIGSAC Conference on Computer and Communications Security. 2016. (Year: 2016).*

Saporito, A. et al., IBM J. Res. & Dev, "Design of the IBM z15 Microprocessor." Published Jul. 10, 2020, pp. 7:1-7:18 (Year: 2020).

Sethumadhavan et al. "Design and Implementation of the TRIPS Primary Memory System." 2006 IEEE, International Conference on Computer Design. pp. 470-476.

Abu-Ghazaleh, Nael et al. "How the Spectre and Meltdown Hacks Really Worked." IEEE Spectrum. Downloaded on Nov. 24, 2019 from https://spectrum.ieee.org/computing/hardware/how-the-spectre-andmeltdown-hacks-really-worked. pp. 1-10.

Fruhlinger, Josh. "Spectre and Meltdown Explained: What They Are, How They Work, What's at Risk." CSO Online. Downloaded on Nov. 24, 2019 from https://csoonline.com/article/3247868/spectre-and-meltdown-explained-what-they-are-how-they-work-whats-at-risk.html pp. 1-10.

Frogh, Anders et al. "Wrangling the Ghost: An Inside Story of Mitigating Speculative Execution Side Channel Vulnerabilities." Microsoft. Downloaded on Nov. 24, 2019 from https://i.blackhat.com/us-18/Thu-August-9/US-18-Fogh-Ertl-Wrangling-with-the-Ghost-An-Inside-Story-of-Mitigating-Speculative-Execution-Side-Channels-Vulnerabilities.pdf. pp. 1-44.

Intel Analysis of Speculative Execution Side Channels. White Paper. Revision 1.0. Jan. 2018. Document No. 336983- 001. pp. 1-12.

Cache Speculation Side-Channels. Whitepaper. Arm Limited. Version 2.4. Oct. 2018. pp. 1-21.

Kocher, Paul et al. "Spectre Attacks: Exploiting Speculative Execution." Submitted on Jan. 3, 2018. Cornell University, Computer Science, Cryptography and Security. arXiv.org>cs>arXiv:1801.01203. pp. 1-19.

Yarom, Yuval et al. "Flush+Reload: a High Resolution, Low Noise, L3 Cache Side-Channel Attack." The University of Adelaid. Computer Science, IACR Cryptol. ePrint Arch. 2013. pp. 1-14.

Ge, Qian et al. "A Survey of Microarchitectural Timing Attacks and Countermeasures on Contemporary Hardware." Journal of Cryptographic Engineering 8, Apr. 2018. pp. 1-37.

Lipp, Moritz et al. "Meltdown: Reading Kernel Memory from user Space." 27th USENIX Security Symposium. Aug. 15-17, 2018. Baltimore, MD, USA. pp. 973-990 ISBN 978-1-939133-04-5.

Ainsworth, Sam et al. "MuonTrap: Preventing Cross-Domain Spectre-Like Attacks by Capturing Speculative State." 2020 ACM/IEEE 47th Annual International Symposium on Computer Architecture (ISCA). pp. 132-144.

Do, Sang Wook Stephen et al. "Transaction-Based Core Reliability." 2020 IEEE International Parallel and Distributed Processing Symposium (IPDPS). pp. 168-179 DOI: 10.1109/IPDPS47924.2020.00027.

Curran, B.W. et al. "The IBM z13 Multithreaded Microprocessor." 2015 IBM Journal of Research and Development vol. 59, No. 4/5 Jul./Sep. 2015 pp. 1-13.

Irie, Hidetsugu et al. "STRAIGHT: Hazardless Processor Architecture Without Register Renaming." 2018 51st Annual IEEE/ACM International Symposium on Microarchitecture. pp. 121-133.

* cited by examiner

PROCESSOR THAT MITIGATES SIDE CHANNEL ATTACKS BY REFRAINING FROM ALLOCATING AN ENTRY IN A DATA TLB FOR A MISSING LOAD ADDRESS WHEN THE LOAD ADDRESS MISSES BOTH IN A DATA CACHE MEMORY AND IN THE DATA TLB AND THE LOAD ADDRESS SPECIFIES A LOCATION WITHOUT A VALID ADDRESS TRANSLATION OR WITHOUT PERMISSION TO READ FROM THE LOCATION

BACKGROUND

A side channel is an unintended pathway that leaks information from one software program (a victim program) to another (the attacker program). The leaked information may be a secret that the victim does not want the attacker to know, such as an encryption key or bank account information. The unintended pathway can, in theory, be any shared hardware resource, such as a central processing unit (CPU) cache, a branch predictor, or a translation lookaside buffer (TLB).

Side channel attacks (SCAs) exploit microarchitectural speculation in high-performance CPUs to break architectural security protections. Speculative execution of an instruction means execution of the instruction during a time when at least one instruction older in program order than the instruction has not completed execution such that a possibility exists that execution of the older instruction will result in an abort, i.e., flush, of the instruction. Opportunities for speculative execution by a CPU are often created by predictions, such as predictions of branch instruction outcomes or predictions that the data written to memory by an instruction is the data that a later instruction wants to read. As a result, an attacker may "encode" privileged information into persistent microarchitectural state. For example, an attacker may encode privileged information, such as a security key, in the presence or absence of a line in a cache if speculatively accessed. This presence or absence of the speculatively accessed line in the cache is not the architectural state of the CPU and therefore not directly visible by the attacker program. However, it may be indirectly visible to an SCA.

More specifically, speculative execution may leave traces of the privileged information in microarchitectural state that can then be revealed based upon the time it takes selected instructions to execute. SCA exploits detect these timing "signals" or differences in the timing of accesses to memory addresses to infer the privileged information used by the victim program.

In a "Flush and Reload" attack, for example, the attacker program first flushes cache lines from the cache at 256 possible memory addresses the victim program will access depending upon the value of a secret data byte the attacker wants to determine (e.g., a byte of an encryption key). The attacker program then causes or waits for the victim program to access the secret data byte, use the secret data byte value to generate a memory address (that is one of the 256 known addresses), and bring the data at the (secret data byte-dependent) generated address into the cache. Next, the attacker program systematically accesses the 256 possible address locations, timing how long each of the 256 accesses takes, which is affected by whether a cache hit or cache miss occurs. By determining which of the 256 addresses was quickly accessed (i.e., got a cache hit), the attacker program indirectly determines the value of the secret data byte.

Known side-channel exploits can be roughly categorized into four groups. Spectre-type attacks are based on speculation past control and data dependencies, e.g., branch predictions. Meltdown-type attacks are based on speculation past architectural or microarchitectural faults, e.g., memory protection violations. Microarchitectural data sampling (MDS) type attacks are based on speculative sampling of stale state left in microarchitectural buffers between a processor and its cache. Microarchitectural shared resource type attacks are based on observation of cross-thread contention for shared microarchitectural resources in multi-threaded CPU designs. Furthermore, even in non-multi-threaded CPUs, there may be shared cache resources (e.g., a shared second-level cache or last level cache (LLC) or snoop filters), which may be leveraged in a shared resource type attach. Such attacks have been effective on some CPUs that have a globally shared inclusive LLC.

"Spectre" attacks trick the processor into incorrect speculative execution. Consider a victim program that contains secret data, such as a secret key, in its memory address space. By searching the compiled victim binary and the operating system (OS)'s shared libraries, an attacker discovers instruction sequences, such as conditional and indirect branches, that can be exploited to reveal information from that address space. Assume that the attacker knows the general or specific location of the secret data.

In a conditional branch attack, the attacker writes a program with mis-training and exploitation aspects. First, the attacker program mis-trains the branch predictor of the CPU to predict that a branch condition of a piece of victim code will be satisfied. For example, in the "Spectre v1" attack, an attacker program causes code to run in a victim program that includes a conditional branch instruction, such as "If index1<array1size then index2=array1[index1] and junk=array2[index2*multiplier]." In the example code, array1 is an array of unsigned bytes and index2 is an unsigned byte. In the victim code, index1 is a large data type (e.g., 32 bits) and can therefore have a very large value. For values of index1 less than array1size, memory accesses are legal; whereas, for values of index1 greater than array1size, memory accesses are illegal. That is, the array bounds check is intended to prevent memory accesses outside array1. The result generated from this first operation ("index2=array1[index1]") is referred to herein as "index2" because it is used to index into array2. The "multiplier" value causes distinct cache lines to be implicated by different values of the secret byte so that later, during a probing portion of the SCA, the attacker reads from 256 different memory addresses that correspond to 256 different cache lines that are implicated by the 256 different possible values of "index2."

To mis-train the branch predictor, the conditional branch instruction is run with valid values for index1 a sufficient number of times to train the branch predictor to predict that the branch condition will be satisfied, i.e., to train the branch predictor that index1 is within the bounds of array1. Previously, the relevant cache lines are either explicitly or effectively flushed. This constitutes the "flush" and "mis-train" aspects of the attack.

The attacker program then invokes the same conditional branch instruction in the victim code using a malicious index1 value that equals the address offset between the memory location of the first element of array1 and the known or guessed memory location of the secret data byte. (Some SCAs instead invoke a different conditional branch instruction that aliases to the same entry in the branch predictor that was trained by the attacker.) The malicious index1 value is outside the bounds of array1.

However, because the branch predictor has been maliciously mis-trained, it predicts that the malicious index1 value is in the bounds of array 1 (i.e., index1<array1size). Therefore, the processor speculatively executes "array1[index1]" using the malicious index1 value. This results in the secret data byte value being loaded from the out-of-bounds location in the victim's memory into a register of the processor, namely from the address of the secret data byte.

Because the attacker flushed the value of array1_size from cache prior to invoking the victim code, the processor must bring in array1_size from memory, which means it will take many clock cycles until the processor can detect that the predicted branch instruction associated with the bounds check was mis-predicted. This creates a high likelihood that the second operation using the index2 value equal to the secret data byte to pull junk data into the cache will occur before the branch mis-prediction is detected. That is, the processor likely will speculatively execute the second operation ("junk=array2[index2*multiplier]"). The purpose of the second operation is to place junk data into a unique one of the 256 cache lines selected by the secret data byte value, i.e., index2. The attack does not care about the contents of the cache line; it only cares that the fetch of the cache line sets up the core part of the attack, which identifies the content of the secret data byte.

After the cache line indexed by the secret data byte value is loaded into the otherwise empty cache, the results are observed by the attacker through the cache timing "side channel" to determine the value of the secret data byte. The attacker code performs a third operation "junk=array2[probe_value*multiplier]" for each of 256 possible 8-bit probe_values, while measuring the amount of time each of the 256 memory accesses takes. This is the core of the attack. Typically, all but one of the 256 runs (and 256 8-bit probe_values) results in a cache miss that requires the processor to access external memory, a slow process that consumes scores of clock cycles. By contrast, a single one of the accesses hits in the cache, which requires a much smaller number of clock cycles. Without directly reading the secret data byte, this side channel portion of the code identifies the probe value associated with the shortest memory access time (the cache hit), knowing that it likely the secret value.

Eventually, the processor discovers that it mis-predicted the bounds check and reverts changes made to its nominal architectural and microarchitectural state, but without reverting the changes made to the cache.

In summary, the Spectre attack works, in the representative example, by (1) knowing where a secret byte is located, (2) flushing the cache, (3) mis-training a branch predictor to mis-predict a malicious array index (based on the known secret byte location) passed to the victim code by the attacker code is within the bounds of a first array (4) through speculative execution because of the branch prediction, indexing the first array with the malicious value in order to retrieve the secret byte; (5) still through speculative execution, using the secret byte to index a second array spanning at least 256 cache lines in order to load a single cache line indexed by the secret byte value, (6) afterwards, timing accesses to the second array for each of 256 possible index values corresponding to the 256 cache liens, and (7) identifying the index value of the second array access that signifies a cache hit, which will be the secret byte value.

In an indirect branch variant of the Spectre attack, an attacker finds the virtual address of a piece of code in the victim program, known as a gadget, that handles secret data. The attacker program trains the processor's branch target buffer (BTB) to mis-predict the target address of an indirect branch instruction to jump to the gadget. Until the mis-prediction is detected by the processor, it speculatively executes instructions of the gadget, which may cause the secret data to be pulled into the cache making the cache a side channel to determine the secret data value by timing subsequent cache accesses similar to the manner described above with respect to the first Spectre attack.

Together, the "flush" and "side-channel" portions of the code are sometimes referred to as a "flush-and-reload" attack, variants of which are used in many other attacks, for example, Meltdown.

In a "Meltdown" attack, unlike the "Spectre" attack, the attack is not dependent on the use of a conditional branch instruction or the mis-training of a branch predictor in order to speculatively execute a load of secret data. Rather, "Meltdown" directly runs load instruction that reads a secret byte from a selected memory location that the load instruction is not privileged to read. The processor may speculatively execute the load instruction and forward the secret byte to dependent instructions before it discovers and deals with the privilege violation. Some processors have been optimized for performance, e.g., for short cycle times, to delay discovering and/or dealing with the privilege violation since privilege violations tend to occur infrequently (outside of SCAs). This may enlarge the window of speculation for dependent instructions to execute. Specifically, during the enlarged speculation window, the dependent instructions may encode the secret byte value into the cache to create the opportunity for a cache timing attack.

There is also a subset of "Meltdown" attacks known as "Foreshadow" attacks. These attacks exploit speculative TLB operations during address translation and cause terminal faults by clearing (or waiting for the OS to clear) a page table entry (PTE) present bit. The resulting dereferencing of the unmapped page from user memory triggers a terminal fault. This exposes metadata left by the OS in the PTE—for example, the physical address to which the page pointed—to exploitation and discovery by transient instructions.

Some "Foreshadow" variants target virtual machines (allowing transient reads of a virtual machine's exclusive memory space), hypervisors (allowing transient reads of the hypervisor's exclusive memory space), and system management mode memory in addition to OS kernel memory.

There is also a class of MDS attacks that eavesdrop on in-flight data from CPU-internal buffers such as line fill buffers, load ports, and store buffers. The discussion herein focuses on three such variants—a store-buffer variant known as "Fallout," a fill buffer variant known as "RIDL" for "Rogue In-Flight Data Load" (alternatively known as "MFBDS" for "Microarchitectural Fill Buffer Data Sampling"), and a load port variant known as "MLPDS" for "Microarchitectural Load Port Data Sampling."

The "Fallout" variant exploits splitting of a store instruction into separate store address (STA) and store data (STD) micro-operations, each of which independently executes and writes into a store buffer. Before the result of an operation is committed to cache memory, it is temporarily stored in a store buffer—a table of address, value, and "is valid" entries. Speculative store-to-load forwarding logic enables the store buffer to forward store data to be used as operands in younger operations. Fallout exploits this to monitor recent stores performed by other programs, containers, operating systems, and virtual machines running on the same hardware thread.

The RIDL or MFBDS variant exploits the design of fill buffers in some processors that support hyper-threading.

Transfers of data from a lower level cache or main memory must pass through the fill buffer, each entry of which is the length of a cache line, before it is transferred to the level-1 data cache. When a line in the fill buffer has been transferred, the line is considered as invalid, but the fill buffer continues to retain the stale information transferred by a previous operation. Because logic enables fill buffer data to be speculatively forwarded to subsequent instructions, an attacker program running as a sibling hyper-thread can indirectly determine the value of that information through a side-channel cache timing attack.

The MLPDS variant also exploits hyper-threading. Data loading from a cache line into the register file must go through a load port, which is large enough—e.g., 512 bits wide—to handle the largest possible load the ISA permits. Because there are typically only a couple of load ports servicing a register file, sibling threads of a hyperthreaded core compete for them. In some processors, smaller 8, 16, 32 and 64-bit loads into the load port do not purge any higher-order bits left over from a previous load. While these processors track the size of the load and forward only those corresponding bits to the register file, the entirety of the load port contents, including several higher-order bits of stale data, may be speculatively forwarded to a subsequent malicious operation even as the load port data is in-flight to the register file. Because a single pass of this attack may recover only some of the bits, the attack may be run repeatedly to probabilistically discover a more complete set of data.

SUMMARY

In one embodiment, the present disclosure provides a microprocessor for mitigating side channel attacks includes a memory subsystem configured to receive a load operation that specifies a load address. The memory subsystem includes a virtually-indexed, virtually-tagged data cache memory (VIVTDCM) comprising entries that hold translation information. The memory subsystem also includes a data translation lookaside buffer (DTLB) comprising entries that hold physical address translations and translation information. The processor is configured to perform speculative execution of instructions and to execute instructions out of program order. The memory system is configured to allow non-inclusion with respect to translation information between the VIVTDCM and the DTLB such that, for instances in time, translation information associated with the load address is present in the VIVTDCM and absent in the DTLB. The memory subsystem is configured to use the translation information of the VIVTDCM to complete execution of the load operation when the load address hits in the VIVTDCM irrespective of whether the translation information is present or absent in the DTLB.

In another embodiment, the present disclosure provides a method for mitigating side channel attacks in a microprocessor configured to speculatively execute instructions out of program order, the microprocessor having a memory subsystem configured to receive a load operation that specifies a load address, the memory subsystem comprising a virtually-indexed, virtually-tagged data cache memory (VIVTDCM) comprising entries that hold translation information and a data translation lookaside buffer (DTLB) comprising entries that hold physical address translations and translation information. The method includes allowing, by the memory system, non-inclusion with respect to translation information between the VIVTDCM and the DTLB such that, for instances in time, translation information associated with the load address is present in the VIVTDCM and absent in the DTLB. The method also includes using, by the memory subsystem, the translation information of the VIVTDCM to complete execution of the load operation when the load address hits in the VIVTDCM irrespective of whether the translation information is present or absent in the DTLB.

In yet another embodiment, the present disclosure provides a microprocessor for mitigating side channel attacks. The microprocessor includes a memory subsystem having a virtually-indexed, virtually-tagged data cache memory and a data translation lookaside buffer (DTLB). The memory subsystem is configured to receive a load operation that specifies a load address. The microprocessor is configured to perform speculative execution of instructions and to execute instructions out of program order. The memory subsystem is configured to, in response to detecting that the load address misses both in the data cache memory and in the DTLB: detect a condition in which the load address specifies a location for which a valid address translation does not currently exist or permission to read from the location is not allowed, and to refrain from allocating an entry in the DTLB for the missing load address in response to detection of the condition.

In yet another embodiment, the present disclosure provides a method for mitigating side channel attacks in a microprocessor configured to speculatively execute instructions out of program order and having a memory subsystem configured to receive a load operation that specifies a load address, the memory subsystem comprising a virtually-indexed, virtually-tagged data cache memory and a data translation lookaside buffer (DTLB). The method includes, in response to detecting that the load address misses both in the data cache memory and in the DTLB: detecting, by the memory subsystem, a condition in which the load address specifies a location for which a valid address translation does not currently exist or permission to read from the location is not allowed, and refraining, by the memory subsystem, from allocating an entry in the DTLB for the missing load address in response to detection of the condition.

DETAILED DESCRIPTION

Figure 1:
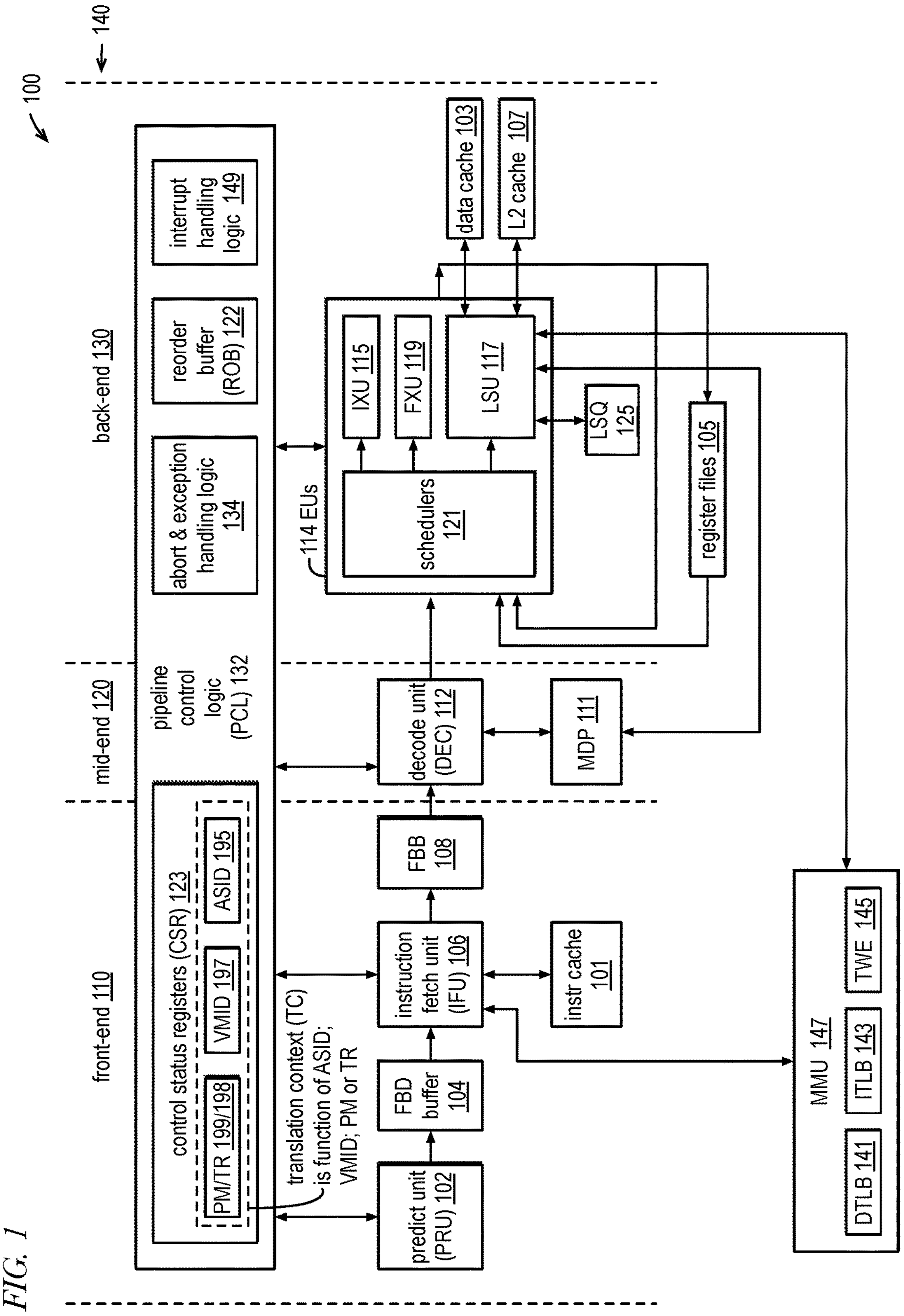
FIG. 1 is an example block diagram of a pipelined super-scalar, out-of-order execution microprocessor core that performs speculative execution of instructions in accordance with embodiments of the present disclosure.

As may be observed from the foregoing, SCAs prey on processors that engage in speculative execution of instructions. Stated alternatively, speculative execution is a critical component to SCA vulnerability. As may also be observed from the foregoing, SCAs exploit the micro-architectural state of data caches of processors that engage in speculative execution of instructions as side channels. However, speculative execution significantly improves processor performance. Therefore, high performance processors will continue to engage in speculative execution.

As mentioned above, one class of SCAs is the Meltdown-type SCAs. In brief, when a load operation, e.g., attempting to read a secret byte, reports the need for an architectural exception, all operations dependent on the excepting load operation are ultimately aborted. However, there may be a small window of time in which the dependent operations may continue to execute speculatively. Embodiments of processors are described herein that perform speculative and out-of-order execution, but that mitigate Meltdown-type SCAs by providing random data as the result data for the excepting load operation. Thus, if the data at the load address is a secret data value, the dependent load operations do not receive the secret data value but instead receive random data. Some processors have attempted to mitigate Meltdown-type SCAs by providing zero-valued data in the case of a permission violation. However, the deterministic zero-valued data was exploited to leak the presence or absence of a permission violation. One use of the inverse-Meltdown-type SCA that allows speculative misuse of the deterministic zero value is an attack that breaks the kernel address space layout randomization (KASLR) mechanism. Providing random data for the bad load operation according to embodiments described herein may also mitigate inverse-Meltdown-type SCAs.

Embodiments of processors are described herein that perform speculative and out-of-order execution, but that may mitigate SCAs by preventing a cache line fill when a load operation that misses in the data cache causes a bad translation condition such as a valid translation is not present for the load address or permission to read from the location specified by the load address is not allowed.

In a conventional physically-tagged L1 data cache plus L1 data TLB micro-architecture, an attacker must get a TLB hit before being able to check for a cache hit/miss. Similar to a Spectre-style SCA that takes advantage of recognizing through speculative execution what address a cache miss occurred to, an SCA may do something similar with the data TLB, i.e., recognizing through speculative execution what address a TLB miss occurred to in order to infer the value of secret data. Embodiments of processors are described herein that perform speculative execution, but that may nevertheless mitigate an SCA of this type. The processor includes a memory subsystem having a virtually-indexed virtually-tagged L1 data cache having entries that hold translation information, which enables a load/store address to hit in the L1 data cache whether or not there is an entry allocated in the data TLB. The memory subsystem allows non-inclusion with respect to translation information between the L1 data cache and the TLB such that there are instances in time in which translation information for a load address is present in the L1 cache and absent in the TLB. In such instances, the memory subsystem completes execution of a load operation (e.g., by an attacker) that specifies the load address that hits in the L1 cache irrespective of whether the translation information is present or absent in the TLB. In one embodiment, the memory subsystem completes execution of the load operation without even accessing the DTLB. Advantageously, a miss in the TLB by the load address may be avoided which would otherwise be detectable by the attacker. An example of a time instance may be caused by a sequence of events as follows. The memory subsystem, during execution of a load operation executed prior to the load operation that implicates a same cache line as the attacker load operation, generates a cache line fill request in response to a miss of the load address in the L1 data cache. The memory subsystem also performs a page table walk in response to a miss of the load address in the TLB during execution of the prior load operation. The page table walk indicates a condition in which the load address specifies a memory location for which a valid address translation does not currently exist or permission to read from the memory location is not allowed. The memory subsystem, in response to the condition indicated by the page table walk, allocates an entry in the L1 data cache and refrains from allocating an entry in the TLB. Therefore, an SCA that may have, for example, pre-flushed the TLB and is looking to get a TLB miss and see at what address it occurred (e.g., in order to obtain the value of a secret byte) may be thwarted from doing so because the load address hits in the L1 data cache and does not cause a TLB miss and fill to occur. Another example of a time instance may be caused by a sequence of events as follows. The memory subsystem executes a load operation prior to execution of the attacker load operation and allocates entries for the (attacker) load address in both the TLB and the L1 data cache. The memory subsystem executes a load/store operation that specifies a different load/store address intermediate the prior load operation and the attacker load operation and replaces the entry allocated in the TLB for the attacker load address.

FIG. 1 is an example block diagram of a pipelined super-scalar, out-of-order execution microprocessor core 100 that performs speculative execution of instructions in accordance with embodiments of the present disclosure.

Speculative execution of an instruction means execution of the instruction during a time when at least one instruction older in program order than the instruction has not completed execution such that a possibility exists that execution of the older instruction will result in an abort, i.e., flush, of the instruction. The core 100 is configured to mitigate SCAs. Although a single core 100 is shown, the SCA mitigation techniques described herein are not limited to a particular number of cores. Generally, the SCA mitigation embodiments may be employed in a processor conforming to various instruction set architectures (ISA), including but not limited to, x86, ARM, PowerPC, SPARC, MIPS. Nevertheless, some aspects of embodiments are described with respect to the microprocessor 100 conforming to the RISC-V ISA, as described in specifications set forth in Volumes I and II of "The RISC-V Instruction Set Manual," Document Version 20191213, promulgated by the RISC-V Foundation. These two volumes are herein incorporated by reference for all purposes. However, the embodiments of the SCA mitigation techniques are not generally limited to RISC-V.

The core 100 has an instruction pipeline 140 that includes a front-end 110, mid-end 120, and back-end 130. The front-end 110 includes an instruction cache 101, a predict unit (PRU) 102, a fetch block descriptor (FBD) FIFO 104, an instruction fetch unit (IFU) 106, and a fetch block (FBlk) FIFO 108. The mid-end 120 include a decode unit (DEC) 112.

The back-end 130 includes a data cache 103, level-2 (L2) cache 107, register files 105, a plurality of execution units (EU) 114, and load and store queues (LSQ) 125. In one embodiment, the register files 105 include an integer register file, a floating-point register file and a vector register file. In one embodiment, the register files 105 include both architectural registers as well as micro-architectural registers. In one embodiment, the EUs 114 include integer execution units (IXU) 115, floating point units (FXU) 119, and a load-store unit (LSU) 117. The LSQ 125 hold speculatively executed load/store micro-operations, or load/store Ops, until the Op is committed. More specifically, the load queue 125 holds a load operation until it is committed, and the store queue 125 holds a store operation until it is committed. The store queue 125 may also forward store data that it holds to other dependent load Ops. When a load/store Op is committed, the load queue 125 and store queue 125 may be used to check for store forwarding violations. When a store Op is committed, the store data held in the associated store queue 125 entry is written into the data cache 103 at the store address held in the store queue 125 entry. In one embodiment, the load and store queues 125 are combined into a single memory queue structure rather than separate queues. The DEC 112 allocates an entry of the LSQ 125 in response to decode of a load/store instruction.

The core 100 also includes a memory management unit (MMU) 147 coupled to the IFU 106 and LSU 117. The MMU 147 includes a data translation lookaside buffer (DTLB) 141, an instruction translation lookaside buffer (ITLB) 143, and a table walk engine (TWE) 145. In one embodiment, the core 100 also includes a memory dependence predictor (MDP) 111 coupled to the DEC 112 and LSU 117. The MDP 111 makes store dependence predictions that indicate whether store-to-load forwarding should be performed. The microprocessor 110 may also include other blocks not shown, such as a write combining buffer, a load buffer, a bus interface unit, and various levels of cache memory above the instruction cache 101 and data cache 103 and L2 cache 107, some of which may be shared by other cores of the processor. Furthermore, the core 100 may be multi-threaded in the sense that it includes the ability to hold architectural state (e.g., program counter, architectural registers) for multiple threads that share the back-end 130, and in some embodiments the mid-end 120 and front-end 110, to perform simultaneous multithreading (SMT).

The core 100 provides virtual memory support. Each process, or thread, running on the core 100 may have its own address space identified by an address space identifier (ASID). The core 100 may use the ASID to perform address translation. For example, the ASID may be associated with the page tables, or translation tables, of a process. The TLBs (e.g., DTLB 141 and ITLB 143) may include the ASID in their tags in order to distinguish entries for different processes. In the x86 ISA, for example, an ASID may correspond to a processor context identifier (PCID). The core 100 also provides machine virtualization support. Each virtual machine running on the core 100 may have its own virtual machine identifier (VMID). The TLBs may include the VMID in their tags in order to distinguish entries for different virtual machines. Finally, the core 100 provides different privilege modes (PM), or privilege levels. The PM of the core 100 determines, among other things, whether or not privileged instructions may be executed. For example, in the x86 ISA there are four PMs, commonly referred to as Ring 0 through Ring 3. Ring 0 is also referred to as Supervisor level and Ring 3 is also referred to as User level, which are the two most commonly used PMs. For another example, in the RISC-V ISA, PMs may include Machine (M), User (U), Supervisor (S) or Hypervisor Supervisor (HS), Virtual User (VU), and Virtual Supervisor (VS). In the RISC-V ISA, the S PM exists only in a core without virtualization supported or enabled, whereas the HS PM exists when virtualization is enabled, such that S and HS are essentially non-distinct PMs. For yet another example, the ARM ISA includes exception levels (EL0, EL1, EL2 and EL3).

As used herein and as shown in FIG. 1, a translation context (TC) of the core 100 (or of a hardware thread in the case of a multi-threaded core) is a function of the ASID, VMID, and/or PM or a translation regime (TR), which is based on the PM. In one embodiment, the TR indicates whether address translation is off (e.g., M mode) or on, whether one level of address translation is needed (e.g., U mode, S mode and HS mode) or two levels of address translation is needed (VU mode and VS mode), and what form of translation table scheme is involved. For example, in a RISC-V embodiment, the U and S privilege modes (or U and HS, when the hypervisor extension is active) may share a first TR in which one level of translation is required based on the ASID, VU and VS share a second TR in which two levels of translation are required based on the ASID and VMID, and M privilege level constitutes a third TR in which no translation is performed, i.e., all addresses are physical addresses.

Pipeline control logic (PCL) 132 is coupled to and controls various aspects of the pipeline 140 which are described in detail herein. The PCL 132 includes a ReOrder Buffer (ROB) 122, interrupt handling logic 149, abort and exception-handling logic 134, and control and status registers (CSR) 123. The CSRs 123 hold, among other things, the PM 199, VMID 197, and ASID 195 of the core 100, or one or more functional dependencies thereof (such as the TR and/or TC). In one embodiment (e.g., in the RISC-V ISA), the current PM 199 does not reside in a software-visible CSR 123; rather, the PM 199 resides in a micro-architectural register. However, the previous PM 199 is readable by a software read of a CSR 123 in certain circumstances, such as upon taking of an exception. In one embodiment, the CSRs 123 may hold a VMID 197 and ASID 195 for each TR or PM.

The pipeline units may signal a need for an abort, as described in more detail below, e.g., in response to detection of a mis-prediction (e.g., by a branch predictor of a direction or target address of a branch instruction, or of a mis-prediction that store data should be forwarded to a load Op in response to a store dependence prediction, e.g., by the MDP 111) or other microarchitectural exception, architectural exception, or interrupt. Examples of architectural exceptions include an invalid opcode fault, debug breakpoint, or illegal instruction fault (e.g., insufficient privilege mode) that may be detected by the DEC 112, a page fault, permission violation or access fault that may be detected by the LSU 117, and an attempt to fetch an instruction from a non-executable page or a page the current process does not have permission to access that may be detected by the IFU 106. In response, the PCL 132 may assert flush signals to selectively flush instructions/Ops from the various units of the pipeline 140. Conventionally, exceptions are categorized as either faults, traps, or aborts. The term "abort" as used herein is not limited by the conventional categorization of exceptions. As used herein, "abort" is a microarchitectural mechanism used to flush instructions from the pipeline 140 for many purposes, which encompasses interrupts, faults and traps. Purposes of aborts include recovering from microarchitectural hazards such as a branch mis-prediction or a store-to-load forwarding violation. The microarchitectural abort mechanism may also be used to handle architectural exceptions and for architecturally defined cases where changing the privilege mode requires strong in-order synchronization to mitigate SCAs. In one embodiment, the back-end 130 of the processor 100 operates under a single PM, while the PM for the front-end 110 and mid-end 120 may change (e.g., in response to a PM-changing instruction) while older instructions under an older PM continue to drain out of the back-end 130. Other blocks of the core 100, e.g., DEC 112, may maintain shadow copies of various CSRs 123 in order to perform their operations.

The PRU 102 maintains the program counter (PC) and includes predictors that predict program flow that may be altered by control flow instructions, such as branch instructions. In one embodiment, the PRU 102 includes a next index predictor (NIP), a branch target buffer (BTB), a main conditional branch predictor (CBP), a secondary conditional branch predictor (BMP), an indirect branch predictor (IBP), and a return address predictor (RAP). As a result of predictions made by the predictors, the core 100 may speculatively execute instructions in the instruction stream of the predicted path.

The PRU 102 generates fetch block descriptors (FBD) that are provided to the FBD FIFO 104 in a first-in-first-out manner. Each FBD describes a fetch block (FBlk or FB). An FBlk is a sequential set of instructions. In one embodiment, an FBlk is up to sixty-four bytes long and may contain as many as thirty-two instructions. An FBlk ends with either a branch instruction to be predicted, an instruction that causes a PM change or that requires heavy abort-based synchronization (aka "stop" instruction), or an indication that the run of instructions continues sequentially into the next FBlk. An FBD is essentially a request to fetch instructions. An FBD may include the address and length of an FBlk and an indication of the type of the last instruction. The IFU 106 uses the FBDs to fetch FBlks into the FBlk FIFO 108, which feeds fetched instructions to the DEC 112. The FBD FIFO 104 enables the PRU 102 to continue predicting FBDs to reduce the likelihood of starvation of the IFU 106. Likewise, the FBlk FIFO 108 enables the IFU 106 to continue fetching FBlks to reduce the likelihood of starvation of the DEC 112. The core 100 processes FBlks one at a time, i.e., FBlks are not merged or concatenated. By design, the last instruction of an FBlk can be a branch instruction, a privilege-mode-changing instruction, or a stop instruction. Instructions may travel through the pipeline 140 from the IFU 106 to the DEC 112 as FBlks, where they are decoded in parallel.

The DEC 112 decodes architectural instructions of the FBlks into micro-operations, referred to herein as Ops. The DEC 112 dispatches Ops to the schedulers 121 of the EUs 114. The schedulers 121 schedule and issue the Ops for execution to the execution pipelines of the EUs, e.g., IXU 115, FXU 119, LSU 117. The EUs 114 receive operands for the Ops from multiple sources including: results produced by the EUs 114 that are directly forwarded on forwarding busses back to the EUs 114 and operands from the register files 105 that store the state of architectural registers as well as microarchitectural registers, e.g., renamed registers. In one embodiment, the EUs 114 include four IXU 115 for executing up to four Ops in parallel, two FXU 119, and an LSU 117 that is capable of executing up to four load/store Ops in parallel. The instructions are received by the DEC 112 in program order, and entries in the ROB 122 are allocated for the associated Ops of the instructions in program order. However, once dispatched by the DEC 112 to the EUs 114, the schedulers 121 may issue the Ops to the individual EU 114 pipelines for execution out of program order.

The PRU 102, IFU 106, DEC 112, and EUs 114, along with the intervening FIFOs 104 and 108, form a concatenated pipeline 140 in which instructions and Ops are processed in mostly sequential stages, advancing each clock cycle from one stage to the next. Each stage works on different instructions in parallel. The ROB 122 and the schedulers 121 together enable the sequence of Ops and associated instructions to be rearranged into a data-flow order and to be executed in that order rather than program order, which may minimize idling of EUs 114 while waiting for an instruction requiring multiple clock cycles to complete, e.g., a floating-point Op or cache-missing load Op.

Many structures within the core 100 address, buffer, or store information for an instruction or Op by reference to an FBlk identifier. In one embodiment, checkpoints for abort recovery are generated for and allocated to FBlks, and the abort recovery process may begin at the first instruction of the FBlk containing the abort-causing instruction.

In one embodiment, the DEC 112 converts each FBlk into a series of up to eight OpGroups. Each OpGroup consists of either four sequential Ops or, if there are fewer than four Ops in the FBlk after all possible four-op OpGroups for an FBlk have been formed, the remaining Ops of the FBlk. Ops from different FBlks are not concatenated together into the same OpGroup. Because some Ops can be fused from two instructions, an OpGroup may correspond to up to eight instructions. The Ops of the OpGroup may be processed in simultaneous clock cycles through later DEC 112 pipe stages, including rename and dispatch to the EU 114 pipelines. In one embodiment, the MDP 111 provides up to four predictions per cycle, each corresponding to the Ops of a single OpGroup. Instructions of an OpGroup are also allocated into the ROB 122 in simultaneous clock cycles and in program order. The instructions of an OpGroup are not, however, necessarily scheduled for execution together.

In one embodiment, each of the EUs 114 includes a dedicated scheduler 121. In an alternate embodiment, a scheduler 121 common to all of the EUs 114 (and integrated with the ROB 122 according to one embodiment) serves all of the EUs 114. In one embodiment, each scheduler 121 includes an associated buffer (not shown) that receives Ops dispatched by the DEC 112 until the scheduler 121 issues the Op to the relevant EU 114 pipeline for execution, namely when all source operands upon which the Op depends are available for execution and an EU 114 pipeline of the appropriate type to execute the Op is available.

The PRU 102, IFU 106, DEC 112, each of the execution units 114, and PCL 132, as well as other structures of the core 100, may each have their own pipeline stages in which different operations are performed. For example, in one embodiment, the DEC 112 has a pre-decode stage, an extract stage, a rename stage, and a dispatch stage.

The PCL 132 tracks instructions and the Ops into which they are decoded throughout their lifetime. The ROB 122 supports out-of-order instruction execution by tracking Ops from the time they are dispatched from DEC 112 to the time they retire. In one embodiment, the ROB 122 has entries managed as a FIFO, and the ROB 122 may allocate up to four new entries per cycle at the dispatch stage of the DEC 112 and may deallocate up to four oldest entries per cycle at Op retire. In one embodiment, each ROB entry includes an indicator that indicates whether the Op has completed its execution and another indicator that indicates whether the result of the Op has been committed to architectural state. More specifically, load and store Ops may be committed subsequent to completion of their execution. Still further, an Op may be committed before it is retired.

Because the ROB 122 retires all Ops and their associated instructions in program order, some Ops may complete execution many cycles before they can be retired or aborted. For example, a speculatively executed instruction may need to be aborted due to detection of a mis-prediction or an architectural exception. The mis-prediction may have been made for the speculatively executed instruction or for an older instruction in program order than the speculatively executed instruction, and the architectural exception could be generated by the speculatively executed instruction or by an older instruction in program order than the speculatively executed instruction. For example, a speculatively executed instruction that loads a secret data byte from a memory address could complete its speculative execution before the processor detects a mis-prediction or architectural exception. For another example, a speculatively executed load/store instruction that uses the secret data byte value—e.g., to modify a previously flushed cache that becomes a side channel to be probed by an SCA to indirectly detect the value of the secret data byte—could complete before the processor detects the mis-prediction or the architectural exception. However, embodiments are described that attempt to mitigate side channel attacks.

Figure 2:
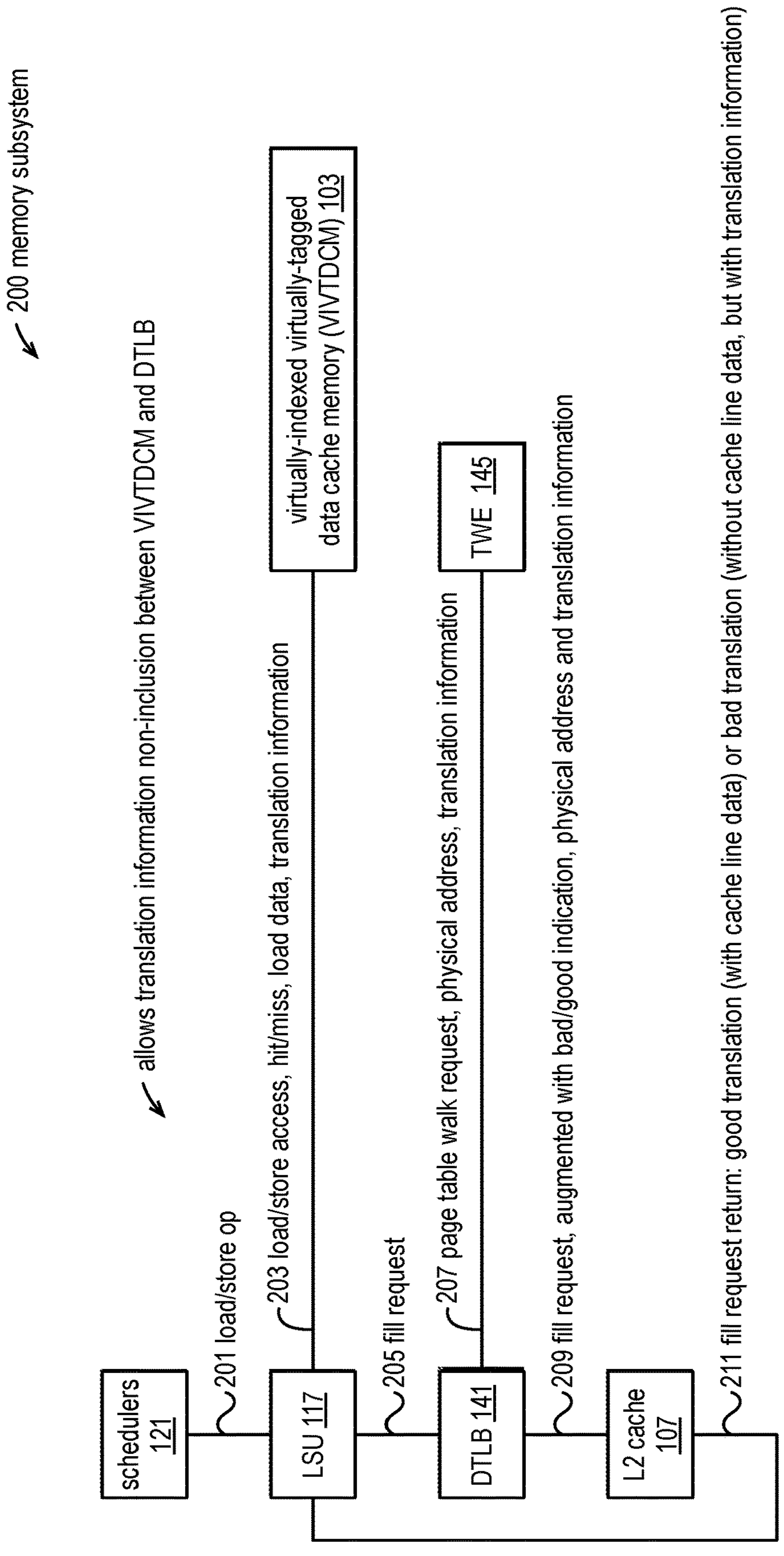
FIG. 2 is an example block diagram of a memory subsystem that includes blocks of FIG. 1 in accordance with embodiments of the present disclosure.

FIG. 2 is an example block diagram of a memory subsystem 200 that includes blocks of FIG. 1 in accordance with embodiments of the present disclosure. The memory subsystem 200 includes the schedulers 121, LSU 117, DTLB 141, L2 cache 107, a virtually-indexed virtually-tagged first-level (L1) data cache memory (VIVTDCM) 103, and TWE 145 of FIG. 1. FIG. 2 illustrates the general flow of processing of load and store operations by the memory subsystem 200.

The scheduler 121 issues a load/store operation 201 to the LSU 117 when all source operands upon which the operation depends are available for execution and a pipeline of the LSU 117 is available to execute the load/store operation 201. The scheduler 121 retains the operation 201 until it completes execution so that the load/store operation 201 may be replayed or retried if necessary. In one embodiment, completion of execution of a load/store operation 201 means the operation 201 (e.g., a load/store operation into which a load/store instruction has been decoded) has been executed by the LSU 117 to the point that there is no longer a possibility of being canceled, retried, replayed, or aborted. Completion of execution of an operation 201 may be signaled by reporting the execution completion to the ROB 122. A load/store operation 201 is canceled if its execution is stopped, e.g., while in the LSU 117 pipeline after being issued thereto. A load/store operation 201 is retried when its execution is canceled and made eligible for reissue by the scheduler 121. A load/store operation 201 is replayed when its execution is canceled and given a status such that it is eligible for reissue by the scheduler 121 at a later point in time, e.g., once all memory operands upon which it is dependent are available, including a return 211 of a cache line fill request, with either a good or bad translation condition, as described in more detail below. An operation 201 is aborted when it is flushed from the pipeline 140.

The LSU 117 executes the load/store operations 201. In one embodiment, the VIVTDCM 103 may be considered as an element included within the LSU 117. The LSU 117 accesses the VIVTDCM 103 with the load/store address 203 specified by the load/store operation 201. The VIVTDCM 103 responds with a hit or miss indication 203. In the case of a hit, the VIVTDCM 103 provides translation information 203 of the load address. For example, the translation information 203 may indicate whether there is a good or bad physical address translation for the load/store address 203. In the case of a good translation, the VIVTDCM 103 also provides the cache line data 203 implicated by the load/store address. In one embodiment, a bad translation means no valid translation exists for the load/store address 203 or permission to read from the location specified by the load/store address 203 is not allowed, as described in more detail below. The translation information 203 may also include permissions and attributes associated with a memory page implicated by the load/store address 203 such as read/write/execute/user permissions, a memory type, and/or whether the page is currently present in memory. Finally, in the case of a bad translation, the translation information 203 may include a type of architectural exception that needs to be generated, as described in more detail below. In the case of a hit for a load operation, the VIVTDCM 103 also outputs on the LSU 117 result bus the data specified by the load operation 201, assuming the load operation 201 has permission to access the load address 203. However, as described in more detail below, if the load operation 201 does not have permission to access the load address 203, then the VIVTDCM 103 outputs true random data or pseudo-random data—referred to generally as random data—on the LSU 117 result bus, which may be beneficial in mitigating a side channel attack. The VIVTDCM 103 is described in more detail below with respect to FIGS. 3 and 4.

If the load/store address 203 misses in the VIVTDCM 103, the LSU 117 generates a cache line fill request 205 (e.g., fill request 433 of FIG. 4) to the DTLB 141 to obtain the cache line implicated by the load/store address 203 and the load/store operation 201 is replayed. As described above, the DTLB 141 is a data TLB, i.e., it holds address translations associated with load and store operations 201 rather than address translations associated with instruction fetches, which are performed by the front-end 110. Hence, generally a memory address specified by a load or store operation 201 (load/store address) should at least have read permissions. The fill request 205 includes the load/store address. The DTLB 141 looks up the load/store address to determine whether it has a translation for the load/store address. If not, i.e., if the load/store address misses in the DTLB 141, the DTLB 141 generates a page table walk request 207 to the TWE 145 of FIG. 1. The TWE 145 performs a page table walk and returns the physical address translation 207 of the load/store address and memory page translation information 207 (e.g., page present, read/write/execute/user permissions, memory type) associated with the memory page implicated by the load/store address. However, in some instances of the load/store address, the page tables may not include a valid translation for the load/store address. For example, the leaf page table entry (PTE) found during the page table walk may have its valid/present bit clear, indicating no valid translation exists for the load/store address. If no valid translation exists, the TWE 145 informs the DTLB 141.

After receiving the response 207 from the TWE 145, in order to obtain the cache line data implicated by the load/store address, the DTLB 141 forwards the fill request 209 on to the L2 cache 107. The fill request 209 is augmented with an indication whether the translation is good or bad, the translation information obtained from the page table walk, and the physical address translation if it exists.

The L2 cache 107 includes a return path for providing the fill request return 211 to the LSU 117. The L2 cache 107 is accessed using the physical address translation 207 received from the DTLB 141 if the translation exists. In one embodiment, if the table walk indicates a bad translation condition—including that no valid translation exists for the load/store address or a valid translation exists but permission to read from the load/store address is not allowed—the DTLB 141 does not allocate an entry for the load/store address, which may be beneficial in mitigating a side channel attack. Instead, the DTLB 141 forwards a bad translation indication 209 to the L2 cache 107, and the L2 cache 107 returns the bad translation indication 211 to the LSU 117 with the returned translation information 211, but without cache line data. If the table walk 207 indicates a good translation, the L2 cache 107 returns a good translation indication 211 along with the translation information 211 and cache line data 211 obtained from the L2 cache 107. If the good physical address misses in the L2 cache 107, the L2 cache 107 obtains the cache line data from a further higher level of the cache hierarchy or from the system memory.

The LSU 117, in response to receiving the fill request return 211, allocates an entry in the VIVTDCM 103. If the fill request return 211 indicates a good translation, the LSU 117 allocates a normal entry that includes the returned cache line data 211. However, if the fill request return 211 indicates a bad translation condition, the LSU 117 allocates a "data-less" entry, i.e., without cache line data, that includes an indication of the bad translation condition and a type of architectural exception that needs to be generated in response to a subsequent hit on the allocated entry. In this manner, the memory subsystem 200 prevents filling of the VIVTDCM 103 with valid cache line data in response to a load/store address miss when a bad translation condition is detected, which may be helpful in mitigating a side channel attack that may try to exploit the cache line fill that is performed in such conditions by conventional high-performance out-of-order and speculative execution processors. More specifically, the memory subsystem 202 is configured to prevent cache line data implicated by the missing load address from being filled into the VIVTDCM 103 in response to detection of a bad translation condition independent of the number of outstanding instructions in the core 100.

Figure 3A:
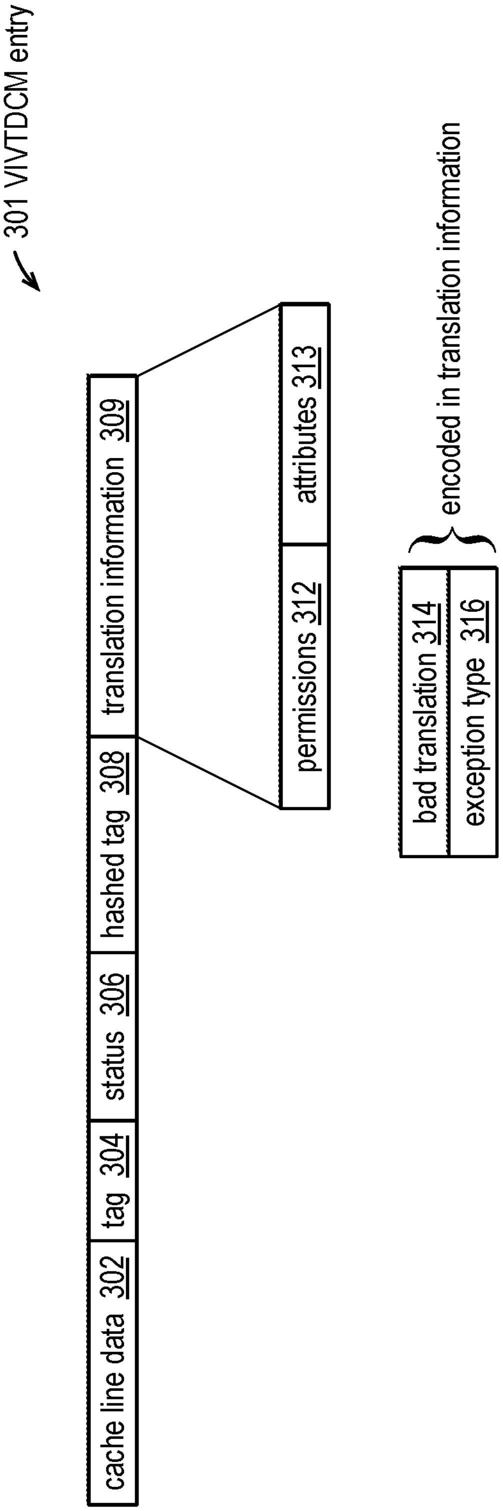
FIG. 3A is an example block diagram of a cache entry of the VIVTDCM of FIG. 2 in accordance with embodiments of the present disclosure.

FIG. 3A is an example block diagram of a cache entry 301 of VIVTDCM 103 of FIG. 2 in accordance with embodiments of the present disclosure. The cache entry 301 is used in the embodiment of FIG. 4 described in more detail below. The cache entry 301 includes cache line data 302, a virtual address tag 304, a status field 306, a hashed tag field 308, and translation information 309. The translation information 309 includes permissions 312 and attributes 313 sub-fields. The permissions 312 specify memory access permissions such as whether a memory location has read permissions, write permissions, execute permissions, and permission to be accessed by a process executing at user privilege level. The attributes 313 specify access attributes of memory locations such as the access types write-back (i.e., cacheable), uncacheable, and write-combine. In one embodiment, the load/store operations in question are cacheable loads and stores, i.e., they specify load/store addresses in cacheable (e.g., write-back) memory regions. The translation information 309 also includes a bad translation indication 314 and an exception type 316. In one embodiment, the bad translation indication 314 and an exception type 316 are encoded in the translation information 309, e.g., a predetermined value of the attributes 313 indicates a bad translation condition in which case the exception type 316 is encoded in the permissions 312. The cache line data 302 is the copy of the data brought into the data cache 103 from system memory, in some embodiments indirectly through a higher level of the cache memory hierarchy, e.g., L2 cache 107. In the case of a load operation, the cache line data 302 is provided on data out bus 427 of FIG. 4, unless the load operation does not have permission to access the load address, in which case random data is provided, as described below.

The tag 304 is upper bits (e.g., tag bits 422 of FIG. 4) of the virtual memory address (e.g., virtual address 423 of FIG. 4) specified by the operation that brought the cache line into the data cache 103, e.g., the virtual memory address specified by a load/store operation. That is, when an entry in the VIVTDCM 103 is allocated, the tag bits 422 of the virtual memory address 423 are written to the virtual address tag 304 of the entry. When the VIVTDCM 103 is subsequently accessed (e.g., by a subsequent load/store operation), the virtual address tag 304 is used to determine whether the access hits in the VIVTDCM 103. Generally speaking, the VIVTDCM 103 uses lower bits (e.g., index bits 426 of FIG. 4) of the virtual memory address to index into the VIVTDCM 103 and uses the remaining bits of the address above the index bits as the tag bits. To illustrate by way of example, assume a 64 kilobyte (KB) VIVTDCM 103 arranged as a 4-way set associative cache having 64-byte cache lines; address bits [5:0] are an offset into the cache line, virtual address bits [13:6](index bits) are used as the set index, and virtual address bits [N−1:14](tag bits) are used as the tag, where N is the number of bits of the virtual memory address.

The status 306 indicates the state of the cache line. More specifically, the status 306 indicates whether the cache line data is valid or invalid. Typically, the status 306 also indicates whether the cache line has been modified since it was brought into the cache memory. The status 306 may also indicate whether the cache line is exclusively held by the cache memory or whether the cache line is shared by other cache memories in the system. An example protocol used to maintain cache coherency defines four possible states for a cache line: Modified, Exclusive, Shared, Invalid (MESI).

The hashed tag 308 is a hash of the tag bits 422 of FIG. 4 of the virtual memory address 423, as described in more detail below. Advantageously, the hashed tag 308 may be used to generate a predicted early miss indication, e.g., miss 429 of FIG. 4, and may be used to generate a predicted early way select signal, e.g., way select 442 of FIG. 4, as described in more detail with respect to FIG. 4.

Figure 4:
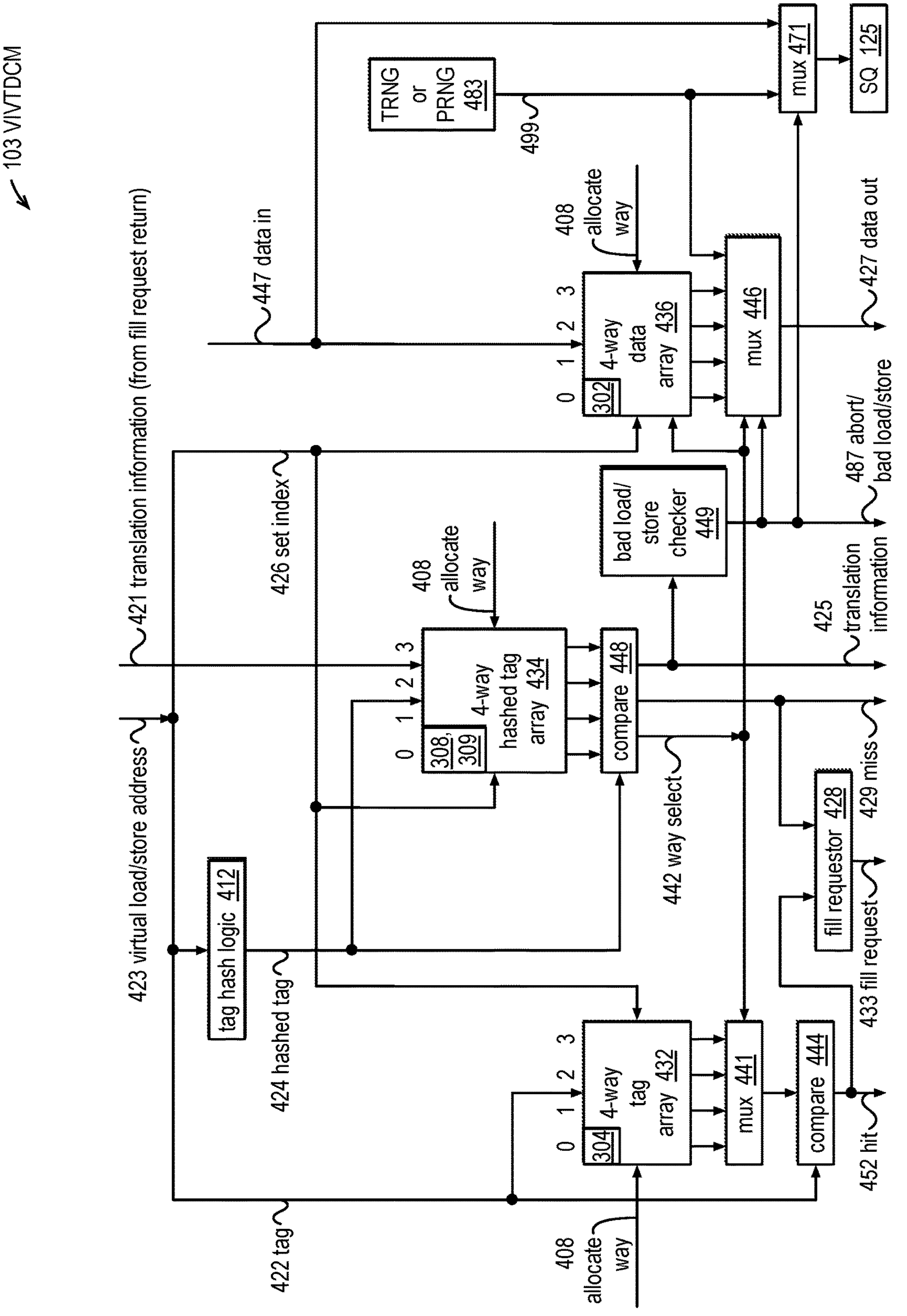
FIG. 4 is an example block diagram illustrating the VIVTDCM of FIG. 2 in accordance with embodiments of the present disclosure.

The translation information 309 is populated via translation information 421 of FIG. 4 based on the fill request return received from the L2 cache 107, as described above. The translation information 309 is provided as translation information 425 of FIG. 4. The permissions 312 are reflective of permissions associated with a physical memory page that includes the cache line data associated with the entry 301. For example, the permissions 312 may be reflective of a valid/present bit from a page table entry (PTE) that indicates whether or not the implicated memory page is currently present in physical memory or has been paged out to a backing store. A page is not present if the valid/present bit in the PTE is clear. For another example, the permissions 312 may include indications of whether the memory page is readable, writable and/or executable. The permissions 312 may also include an indication whether the page is accessible by a user mode process. The permissions 312 may be used to determine whether a load/store operation generates the need for an architectural exception. The bad translation indication 314 indicates whether the entry 301 is associated with a good or bad translation, as indicated by the fill request return provided by the L2 cache 107, as described above. If the bad translation indication 314 indicates a bad translation, this is also an indication that the entry 301 is a dataless entry, i.e., the cache line data 302 is not valid. The exception type 316 is generated by the DTLB 141 (or by the L2 cache 107 in other embodiments) in the case of a bad translation condition. In one embodiment, if a valid translation does not exist, the exception type 316 is set to indicate a page fault. In one embodiment, if permission to read from the memory page is not allowed, the exception type 316 is set to a page fault. In one embodiment directed to the RISC-V ISA that supports permissions/attributes mechanisms in addition to PTE page permissions, the exception type 316 may be set to indicate an access fault, e.g., if physical memory protection (PMP) registers or physical memory attribute (PMA) registers indicate permission to read from the location specified by the load/store address is not allowed. In one embodiment, the ISA does not allow write permission without also permitting reads.

Figure 3B:
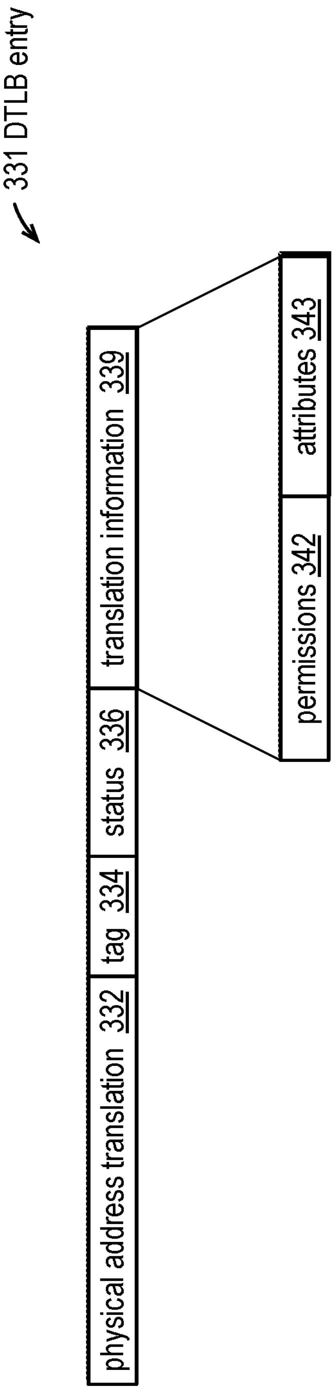
FIG. 3B is an example block diagram of an entry of the DTLB of FIG. 2 in accordance with embodiments of the present disclosure.

FIG. 3B is an example block diagram of an entry 331 of DTLB 141 of FIG. 2 in accordance with embodiments of the present disclosure. The DTLB entry 331 includes a physical address translation 332, a virtual address tag 334, a status field 336, and translation information 339. The physical address translation 332 is a translation of a virtual address, e.g., such as virtual load/store addresses 423 of FIG. 4. The virtual address tag 334 and status 336 serve similar purposes to those of the address tag 304 and status 306 of FIG. 3A except for the DTLB 141. In one embodiment, the tag 334 includes translation regime information in addition to address bits. In one embodiment, the translation information 339 is similar to the translation information 309 of FIG. 3A. In one embodiment, the translation information 339 includes a global page indicator that is not included in the translation information 309 of FIG. 3A, although the DTLB 141 may not be configured to hold bad translation entries, thus the translation information 339 need not be encoded to indicate a bad translation condition nor an exception type.

FIG. 4 is an example block diagram illustrating the VIVTDCM 103 of FIG. 2 in accordance with embodiments of the present disclosure. In the embodiment of FIG. 4, the VIVTDCM 103 is a virtual cache, i.e., it is virtually-indexed and virtually-tagged. The VIVTDCM 103 includes a tag array 432, a data array 436, a hashed tag array 434, a multiplexer 441, a comparator 444, a multiplexer 446, a comparator 448, tag hash logic 412, a cache line fill requestor 428, a bad load/store checker 449, a multiplexer 471, and a true random number generator (TRNG) or pseudo-random number generator (PRNG) 483, referred to generally as the RNG 483. The VIVTDCM 103 also includes a virtual load/store address input 423. The virtual load/store address 423 includes a tag 422 portion and a set index 426 portion. The VIVTDCM 103 also includes an allocate way input 408 for allocating an entry into the VIVTDCM 103. The VIVTDCM 103 also includes a data in input 447 for writing data into the VIVTDCM 103, e.g., during a store operation and during an allocation of an entry 301. Because the VIVTDCM 103 is virtually-indexed and virtually-tagged, no physical address bits are needed to access it and, therefore, the VIVTDCM may be accessed without the need for a physical address translated from the virtual load/store address 423.

The VIVTDCM 103 also includes a hit output 452, an early miss prediction 429, a translation information 425 output, and a data out output 427. The tag array 432 and data array 436 are random access memory arrays. In the embodiment of FIG. 4, the VIVTDCM 103 is arranged as a 4-way set associative cache; hence, the tag array 432 and data array 436 are arranged as 4-way set associative memory arrays. However, other embodiments are contemplated in which the associativity has a different number of ways than four, including direct-mapped and fully associative embodiments. The set index 426 selects the set of entries on each allocation or access, e.g., load/store operation.

The RNG 483 generates random numbers 499 that are provided as a fifth input to the mux 446 along with the four outputs corresponding to the four ways of the data array 436. In one embodiment, the random numbers 499 are 64-bit data. In embodiments in which the RNG 483 is a TRNG, the TRNG 483 generates true random numbers, i.e., numbers that are produced by a physical process. Examples of a physical process used to generate true random numbers include avalanche noise or breakdown noise generated from a diode, thermal noise from a resistor, and arrangements of free running oscillators whose randomness may be attributable to variations in temperature, material (e.g., semiconductor) characteristics, and electrical conditions local to the integrated circuit. In embodiments in which the RNG 483 is a PRNG, the PRNG 483 generates pseudo-random numbers, i.e., numbers that are produced algorithmically. Various embodiments of the RNG 483 are described below with respect to FIGS. 13 through 17. As described herein, the provision of random load data during execution of a load operation under certain conditions may be helpful in mitigating side channel attacks, such as Meltdown and inverse-Meltdown style SCAs.

In the embodiment of FIG. 4, each entry of the VIVTDCM 103 is structured as the entry 301 of FIG. 3A, having cache line data 302, a tag 304, a status 306, a hashed tag 308, and translation information 309. The data array 436 holds the cache line data 302 associated with each of the entries 301 of the VIVTDCM 103. The tag array 432 holds the tag 304 associated with each of the entries 301 of the VIVTDCM 103. The hashed tag array 434, also referred to as a hashed address directory 434, holds the hashed tag 308 and translation information 309 associated with each of the entries 301 of the VIVTDCM 103. In one embodiment, the status 306 of each entry is also stored in the tag array 432, whereas in another embodiment the VIVTDCM 103 includes a separate memory array for storing the status 306 of the entries. Although in the embodiment of FIG. 4 the data array 436 and tag array 432 are separate, other embodiments are contemplated in which the data and tag (and status) reside in the same memory array.

The cache line fill requestor 428 receives the early miss indication 429 and the hit signal 452, both of whose generation are described in more detail below, and generates a cache line fill request 433 if the early miss indication 429 indicates a miss (i.e., is true) or if the hit signal 452 indicates a miss (i.e., is false). The fill request 433 is provided to the DTLB 141. The fill request 433 specifies the load/store address 423. When a load/store address 423 accesses the VIVTDCM 103 and hits on an entry 301, i.e., a valid tag match occurs, the hit signal 452 is true and the miss signal 429 is false even if the bad translation indication 314 indicates a bad translation condition. As a result, the fill requestor 428 does not generate a fill request 433 in the case of a bad translation condition.

The tag hash logic 412 hashes the tag 422 portion of the virtual load/store address 423 to generate the hashed tag 424. That is, the tag 422 is an input to a hash function performed by tag hash logic 412 that outputs the hashed tag 424. The hash function performs a logical and/or arithmetic operation on its input bits to generate output bits. For example, in one embodiment, the hash function is a logical exclusive-OR on at least a portion of the tag 422 bits. The number of output bits of the hash function is the size of the hashed tag 424 and the hashed tag field 308 field of the data cache entry 301. The hashed tag 424 is provided as an input to the hashed tag array 434 for writing into the hashed tag 308 of the selected entry 301 of the hashed tag array 434, e.g., during an allocation. Similarly, translation information 421 obtained from a fill request return are written into the translation information 309 of the selected entry 301 of the hashed tag array 434 during an allocation. The set index 426 selects the set of entries of the hashed tag array 434. In the case of an allocation, the hashed tag 424 and translation information 421 are written into the hashed tag 308 and translation information 309, respectively, of the entry of the way selected by an allocate way input 408 of the selected set. In the case of an access, comparator 448 compares the hashed tag 424 with each of the hashed tags 308 of the selected set. If there is a valid match, the early miss signal 429 is false and the way select 442 indicates the matching way and the translation information 309 of the matching way is provided as translation information 425; otherwise, the early miss signal 429 is true.

Because the hashed tag 424 and the hashed tags 308 are small (e.g., 16 bits as an illustrative example) relative to the tag 422 and tags 304 (e.g., 54 bits as an illustrative example), the comparison performed by comparator 448 may be faster than the comparison performed by comparator 444 (described more below), for example. Therefore, the way select 442 may be signaled by an earlier stage in the data cache memory 103 pipeline than an embodiment that relies on a comparison of the tags 304 of the tag array 432 to generate a way select. This may be advantageous because it may shorten the time to data out 427 and may provide the translation information 425 sooner to enable detection of a need for generation of an architectural exception and provision of random data 499 as data out 427 via mux 446, as described in more detail below.

Additionally, the early miss prediction 429 may be signaled by an earlier stage than the stage that signals the hit indicator 452 (described in more detail below). This may be advantageous because it may enable the cache line fill requestor 428 to generate a cache line fill request 433 to fill a missing cache line earlier than an embodiment in which the cache line fill requestor 428 would rely solely on a comparison of the tags 304 in the tag array 432 to detect a miss via a false value on hit indicator 452. Thus, the hashed tag array 434 may enable a high performance, high frequency design of the processor 100.

Due to the nature of the hashed tag 424, if the early miss indicator 429 indicates a false value, i.e., indicates a hit, the hit indication may be incorrect, i.e., the hit indicator 452 may subsequently indicate a false value, i.e., a miss. Thus, the early miss indicator 429 is a prediction, not necessarily a correct miss indicator. This is because differing tag 422 values may hash to the same value. However, if the early miss indicator 429 indicates a true value, i.e., indicates a miss, the miss indication is correct, i.e., the hit indicator 452 will also indicate a miss, i.e., will indicate a false value. This is because if two hash results are not equal (assuming they were hashed using the same hash algorithm), then they could not have been generated from equal inputs, i.e., matching inputs.

The tag 422 is provided as an input to the tag array 432 for writing into the tag 304 field of the selected entry of the tag array 432, e.g., during an allocation. The set index 426 selects the set of entries of the tag array 432. In the case of an allocation, the tag 422 is written into the tag 304 of the entry of the way selected by the allocate way input 408 of the selected set. In the case of an access (e.g., a load/store operation), the mux 441 selects the tag 304 of the way selected by the early way select 442, and the comparator 444 compares the tag 422 with the tag 304 of the selected set. If there is a valid match, the hit signal 452 is true; otherwise, the hit signal 452 is false. In the embodiment of FIG. 4, cache line fill requestor 428 advantageously uses the early miss prediction 429 provided by the hashed tag array 434 in order to generate a fill request 433 as soon as possible, rather than waiting for the hit signal 452. However, in embodiments of the LSU 117 that employ the VIVTDCM 103 of FIG. 4, the cache line fill requestor 428 is also configured to examine both the early miss prediction 429 and the hit indicator 452, detect an instance in which the early miss prediction 429 predicted a false hit—i.e., the hit indicator 452 indicates a miss even though the early miss prediction 429 indicated a hit—and generate a fill request 433 accordingly.

The bad load/store checker 449 determines from the translation information 425 whether or not the load/store operation is a bad load/store operation, which it indicates on bad load/store indicator 487. As described in more detail with respect to FIG. 12, in one embodiment, the bad load/store indicator 487 indicates a bad load/store operation if the load/store operation does not have permission to access the load/store address (e.g., no read/write permission or no permission for access by a process executing with user privilege level) or if the load/store address specifies a location for which a valid address translation does not currently exist (e.g., the PTE valid/present bit is clear). The bad load/store indicator 487 is provided as a control input to the data out mux 446 and to store queue 125 input mux 471. The bad load/store indicator 487 is also provided as abort signal 487 to the pipeline control logic 132 of FIG. 1 to indicate the need for an abort and architectural exception, as described in more detail below.

The data array 436 receives the data in input 447 for writing into the cache line data 302 field of the selected entry of the data array 436, e.g., during a cache line allocation or a store operation. The set index 426 selects the set of entries of the data array 436. In the case of an allocation, the way of the selected set is selected by the allocate way input 408, and in the case of a memory access operation (e.g., load/store operation) the way is selected by the way select signal 442. In the case of a read operation (e.g., load operation), the mux 446 receives the cache line data 302 of all four ways and selects one of the ways based on the way select signal 442, and the cache line data 302 selected by the mux 446 is provided on the data out output 427, unless the mux 446 is controlled to select the random data 499 from the RNG 483 because the bad load/store indicator 487 is true. The multiplexer 471 receives the random data 499 from the RNG 499 and the data in 447. The multiplexer 471 is controlled by the bad load/store indicator 487. If the bad load/store indicator 487 is true, then the multiplexer 471 selects the random data 499 for provision to the store queue 125, otherwise the multiplexer 471 selects the data in 447 for provision to the store queue 125.

Figure 5:
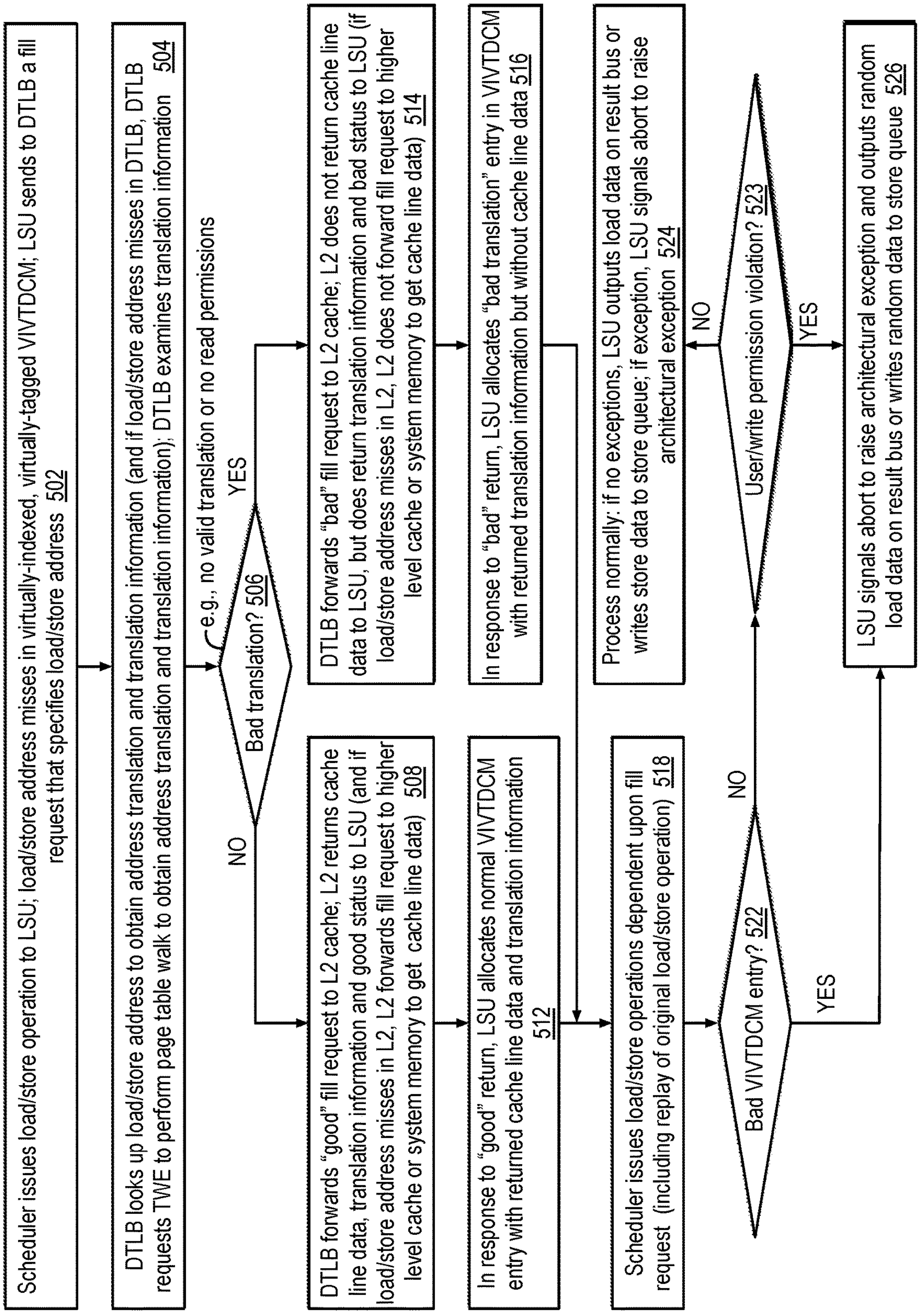
FIG. 5 is an example flowchart illustrating operation of a memory subsystem that includes a virtually-indexed, virtually-tagged data cache memory of a processor to mitigate side channel attacks according to embodiments of the present disclosure.

FIG. 5 is an example flowchart illustrating operation of a memory subsystem that includes a virtually-indexed, virtually-tagged data cache memory (e.g., memory subsystem 200 of FIG. 2) of a processor to mitigate side channel attacks according to embodiments of the present disclosure. Operation begins at block 502.

At block 502, a scheduler (e.g., scheduler 121 of FIG. 2) issues a load/store operation to a LSU (e.g., LSU 117 of FIG. 2). The LSU accesses a virtually-indexed virtually-tagged data cache memory (e.g., VIVTDCM 103 of FIG. 2) using a load/store address (e.g., load/store address 423 of FIG. 4) specified by the load/store operation which misses in the VIVTDCM. In response, the LSU generates a fill request (e.g., fill request 433 of FIG. 4) that specifies the load/store address and that is sent to a data translation lookaside buffer (e.g., DTLB 141 of FIG. 2). The operation described with respect to FIG. 5 and other flowcharts herein (e.g., FIGS. 8 through 11) is not intended to be an exhaustive description, but rather a description of aspects of the operation of the memory subsystem to illustrate embodiments described herein. For example, although FIG. 5 does not describe the operation of the memory subsystem when the load/store address hits in the VIVTDCM, it should be understood that the memory subsystem is configured to handle such cases. Operation proceeds to block 504.

At block 504, DTLB looks up the load/store address to obtain an address translation and translation information (e.g., translation information 203 of FIG. 2). If the load/store address misses in the DTLB, then the DTLB requests a table walk engine (e.g., TWE 145 of FIG. 2) to perform a page table walk to obtain the address translation and translation information associated with the load/store address. The DTLB examines the obtained translation information to determine whether the load/store address has a bad translation condition. In one embodiment, the load/store address has a bad translation condition if the load address specifies a location for which a valid address translation does not currently exist or permission to read from the location is not allowed. Operation proceeds to decision block 506.

At block 506, if the translation information indicates a bad translation condition, operation proceeds to block 514; otherwise, operation proceeds to block 508.

At block 508, the DTLB forwards the fill request to the second-level cache (e.g., L2 cache 107 of FIG. 2) with an indication that the translation is a good translation. In response, the L2 cache returns (e.g., via fill request return 211 of FIG. 2) to the LSU the cache line data and translation information implicated by the load/store address as well as an indicator that indicates the translation associated with the load/store address is a good translation. Additionally, if the load/store address misses in the L2 cache, the L2 cache forwards the fill request to a higher level of the cache memory hierarchy (not shown, but present in some embodiments, e.g., L3 cache) to obtain the cache line data or to a bus interface unit (not shown) to obtain the cache line data from system memory. Operation proceeds to block 512.

At block 512, in response to the good translation indicated in the fill request return, the LSU allocates a normal entry in the VIVTDCM and populates it with the returned cache line data and translation information. That is, the LSU allocates a good translation entry. Operation proceeds to block 518.

At block 514, the DTLB forwards the fill request to the second-level cache with an indication that the translation is a bad translation. In response, the L2 cache does not return cache line data to the LSU. However, the L2 cache returns translation information implicated by the load/store address as well as an indicator that indicates the translation associated with the load/store address is a bad translation. Additionally, if the load/store address misses in the L2 cache, the L2 cache does not forward the fill request to a higher level of the cache memory hierarchy or to the bus interface unit. Thus, cache line data implicated by the missing load address is prevented from being filled into further levels of the cache memory hierarchy of the memory subsystem in response to detection of the bad translation condition. Operation proceeds to block 516.

At block 516, in response to the bad translation indicated in the fill request return, the LSU allocates a bad translation entry in the VIVTDCM but does not populate it with cache line data. More specifically, the LSU populates the bad translation indication 314 with a bad translation indication and populates the permissions 312 based on the permissions specified in the fill request return. Finally, the LSU populates the exception type field 316 with the exception type that should be raised in response to a hit upon the bad translation entry. The bad translation entry may be hit upon by the load/store operation that originally missed in the VIVTDCM upon retry thereof as well as any other load/store operations in the scheduler dependent upon the fill request as well as any subsequent load/store operations that hit upon the bad translation entry. In one embodiment, the bad translation entry may be replaced by a cache line replacement or may be invalidated by a cache line invalidate operation of the load/store address. In one embodiment, the bad translation entry may also be invalidated by a TLB invalidate operation that specifies the load/store address. Operation proceeds to block 518.

At block 518, in response to the fill request return—either good or bad, the scheduler begins to issue load/store operations that are dependent upon the fill request return which may hit upon the entry allocated at either block 512 or block 516. As described above, the entry may be hit upon by the load/store operation that originally missed in the VIVTDCM upon retry thereof, other load/store operations dependent upon the fill request, and/or subsequent load/store operations that hit upon the entry. Operation proceeds to decision block 522.

At decision block 522, if the hit upon entry indicates a bad translation condition (e.g., the bad translation indication 314 of FIG. 3A indicates a bad translation condition), operation proceeds to block 526; otherwise, operation proceeds to decision block 523.

At decision block 523, if there is a user permission violation or a write permission violation, operation proceeds to block 526; otherwise, operation proceeds to block 524. A user permission violation is detected by the memory subsystem (e.g., LSU 117) if the permissions associated with the load/store address do not allow processes with user level privilege to access the load/store address and the load/store operation is being executed for a process that has user level privilege, rather than supervisor level privilege. A write permission violation is detected by the memory subsystem if the load/store operation is a store operation and permission to write the store address is not allowed.

At block 524, the LSU processes the load/store operation normally. That is, if the load/store operation causes a need to generate an exception (i.e., other than due to a bad translation condition which is handled via block 526), the LSU signals a request for an abort (e.g., via abort signal 487 of FIG. 4), and in response control logic (e.g., pipeline control logic 132 of FIG. 1) raises an architectural exception (assuming the abort request is the highest priority request). Otherwise, the LSU outputs the requested data from the cache line of the hit upon entry onto its result bus in the case of a load operation, and in the case of a store operation, the LSU writes the store data to the entry in the store queue (e.g., store queue 125 of FIG. 1) allocated for the store operation.

At block 526, the LSU signals a request for an abort, and in response control logic raises an architectural exception. In one embodiment, the architectural exception raised is a page fault. Additionally, in the case of a load operation, the LSU outputs random data to its result bus (e.g., random data 499 generated by the RNG 483 of FIG. 4). Alternatively, in the case of a store operation, the LSU writes random data (e.g., random data 499 generated by the RNG 483 of FIG. 4 via mux 471) to the entry in the store queue allocated for the store operation, which may be helpful in mitigating side channel attacks that attempt to capitalize on speculative store-to-load forwarding.

Figure 6:
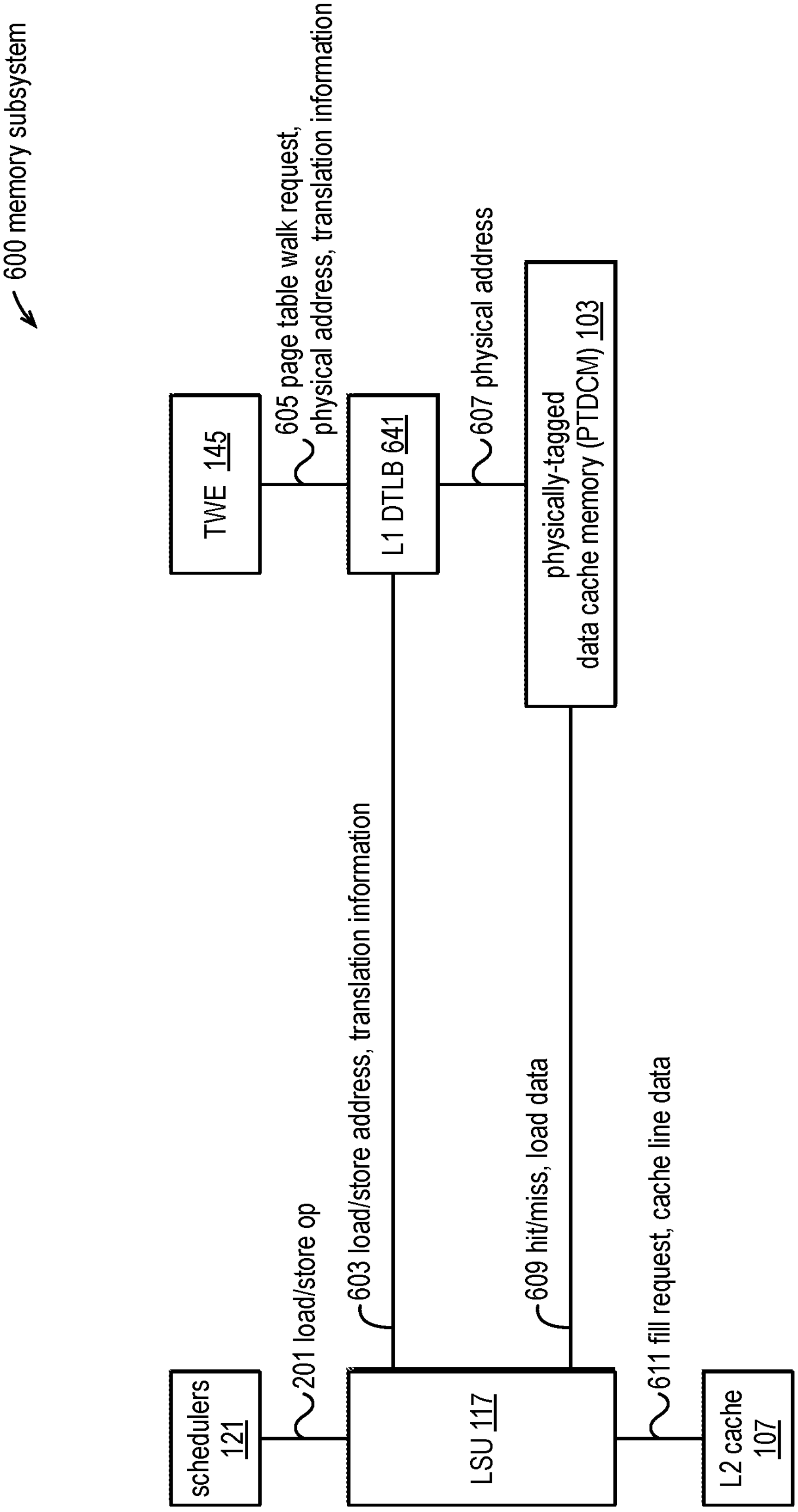
FIG. 6 is an example block diagram of a memory subsystem that includes blocks of FIG. 1 in accordance with embodiments of the present disclosure.

FIG. 6 is an example block diagram of a memory subsystem 600 that includes blocks of FIG. 1 in accordance with embodiments of the present disclosure. The memory subsystem 600 is similar in some respects to the memory subsystem 200 of FIG. 2. However, the memory subsystem 600 of FIG. 6 includes a physically-tagged L1 data cache memory (PTDCM) 103, rather than a VIVTDCM as in the embodiment of FIG. 2. Additionally, the DTLB 641 is coupled to the LSU 117 and to the PTDCM 103. Hence, the DTLB 641 may be considered a first level TLB, in contrast to the DTLB 141 of the embodiment of FIG. 2. Finally, the LSU 117 is coupled to the L2 cache 107.

The scheduler 121 issues a load/store operation 201 to the LSU 117, as in the embodiment of FIG. 2. The LSU 117 accesses the DTLB 641 with the virtual load/store address 603 specified by the load/store operation. In response, the DTLB 641 provides to the PTDCM 103 the physical address translation 607 of the virtual load/store address 603 and provides the associated translation information 603 to the LSU 117. The LSU 117 examines the translation information 603 to determine whether there is a bad translation condition or a permission violation for the virtual load/store address 603. If the load/store address 603 misses in the DTLB 641, the DTLB 641 first issues to the TWE 145 a page table walk request 605 to obtain the physical address and translation information 605. In response to being accessed by the physical address 607, the PTDCM 103 provides a hit/miss indication 609 to the LSU 117. In the case of a hit, if there is a bad translation condition or permission violation condition, in the case of a load operation, the LSU 117 outputs random data (e.g., random data 499 generated by the RNG 483 of FIG. 7) on its result bus, which may be helpful in mitigating a side channel attack; in the case of a store operation, the LSU 117 writes the physical address and random data to a store queue 125 entry allocated for the store operation which may be helpful in mitigating side channel attacks that attempt to capitalize on speculative store-to-load forwarding. If there is a good translation and no permission violation, the LSU processes the load/store operation normally. That is, assuming no exceptions, in the case of a load operation, the PTDCM 103 provides the load data 609 to the LSU 117; in the case of a store operation, the LSU 117 writes the physical address and store data to the store queue 125 entry. In the case of a miss of the load/store address 603 in the PTDCM 103, the LSU 117 generates a fill request 611 to the L2 cache 107 to obtain the missing cache line data 611, unless a bad translation condition or permission violation is detected from the translation information 603 received from the DTLB 641. In that case, the LSU 117 does not generate a fill request as described in more detail below, e.g., with respect to FIG. 8, in order to prevent filling of the PTDCM 103 and further cache levels with cache line data, which may be helpful in mitigating a side channel attack. When a bad translation condition or permission violation is detected, the LSU 117 outputs random data on its result bus in the case of a load operation, and in the case of a store operation, the LSU 117 writes random store data to the store queue 125.

Figure 7:
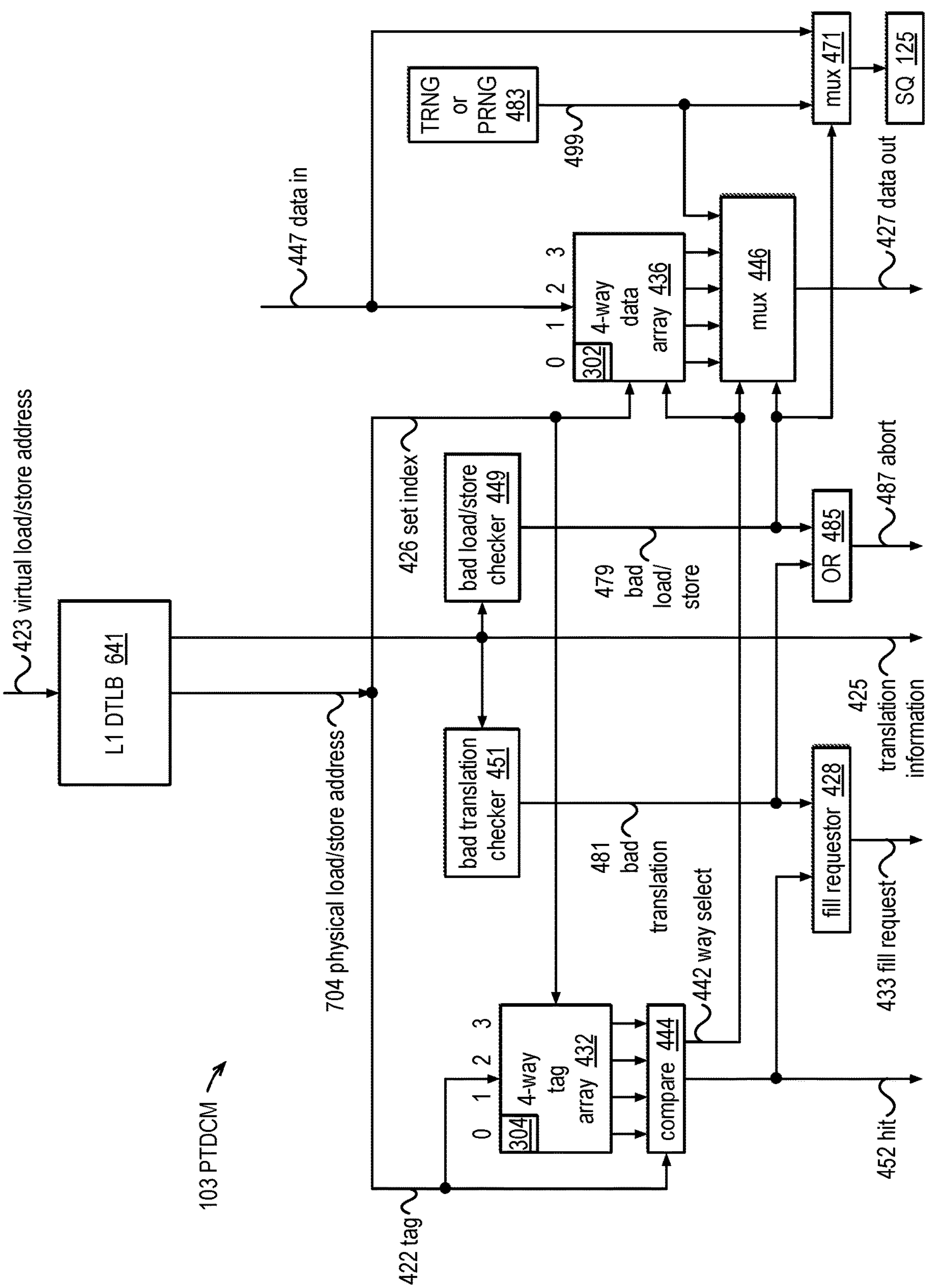
FIG. 7 is an example block diagram illustrating the PTDCM of FIG. 6 in accordance with embodiments of the present disclosure.

FIG. 7 is an example block diagram illustrating the PTDCM 103 of FIG. 6 in accordance with embodiments of the present disclosure. The PTDCM 103 of FIG. 7 is similar in some respects to the VIVTDCM of FIG. 4. However, the PTDCM 103 does not include the tag has logic 412, hashed tag array 434, comparator 448, or mux 441 of FIG. 4. Instead, the comparator 444 receives the tags 304 of the four selected ways and generates the hit signals 452 and provides the way select 442 to the mux 446. Furthermore, the translation information 425 and a physical load/store address 704 are provided by the DTLB 641 in response to the load/store address 423. Similar to operation of the embodiment of FIG. 4, the bad load/store checker 449 receives the translation information 425 and determines whether or not the load/store operation is a bad load/store operation which it indicates on bad load/store indicator 479. The bad load/store indicator 479 indicates a true value when the translation information 425 indicates the load/store operation does not have permission to access the load/store address (e.g., no read/write permission or no permission for access by a process executing with user privilege level) or if the load/store address specifies a location for which a valid address translation does not currently exist (e.g., the PTE valid/present bit is clear). The bad load/store indicator 479 controls the data out mux 446 to select the random data 499 provided by the RNG 483 in the case of a bad load operation, which may be helpful in mitigating a side channel attack. The bad load/store indicator 479 also controls the store queue 125 data input mux 471 to select the random data 499 provided by the RNG 483 in the case of a bad store operation, which may be helpful in mitigating a side channel attack that attempts to exploit speculative store-to-load forwarding. A bad translation checker 451 receives the translation information 425 and determines whether or not a bad translation condition exists for the load/store operation. If so, the bad translation checker 451 generates a true value on the bad translation indicator 481; otherwise, the bad translation checker 451 generates a false value on the bad translation indicator 481 to indicate a good translation. The bad translation checker 451 generates a true value on the bad translation indicator 481 when the translation information 425 indicates that no valid translation exists for the load/store address 423 or a valid translation exists but permission to read from the load/store address is not allowed. The bad load/store indicator 479 and bad translation indicator 481 are provided to an OR gate 485 that generates an abort signal 487 to the pipeline control logic 132 to indicate the need for an abort and architectural exception if the bad load/store indicator 479 is true or if the bad translation indicator 481 is true. Finally, the bad translation indicator 481 is provided to the fill requestor 428 so that the fill requestor 428 does not generate a fill request 433 when the bad translation indicator 481 indicates a bad translation condition so that cache line data is prevented from being filled into the PTDCM 103, which may be helpful in mitigating a side channel attack.

Figure 8:
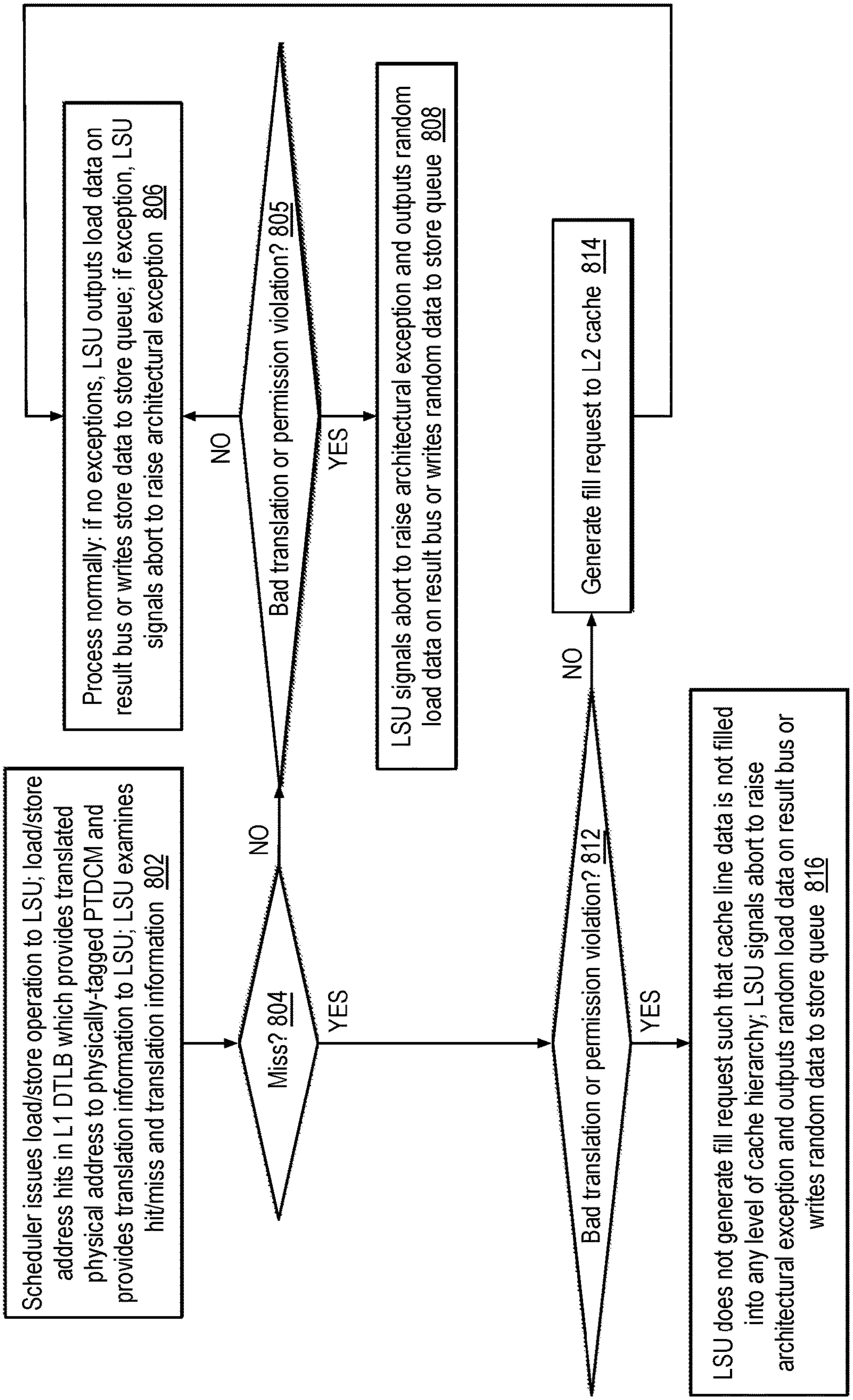
FIG. 8 is an example flowchart illustrating operation of a memory subsystem that includes a physically-tagged data cache memory of a processor to mitigate side channel attacks according to embodiments of the present disclosure.

FIG. 8 is an example flowchart illustrating operation of a memory subsystem that includes a physically-tagged data cache memory (e.g., memory subsystem 600 of FIG. 6) of a processor to mitigate side channel attacks according to embodiments of the present disclosure. Operation begins at block 802.

At block 802, a scheduler (e.g., scheduler 121 of FIG. 6) issues a load/store operation to a LSU (e.g., LSU 117 of FIG. 6). The LSU accesses a physically-tagged data cache memory (e.g., PTDCM 103 of FIG. 6) using a load/store address (e.g., load/store address 423 of FIG. 7) specified by the load/store operation which hits in a DTLB (e.g., DTLB 641 of FIG. 7). The DTLB provides a physical address translation (e.g., physical load/store address 704 of FIG. 7) to the PTDCM and provides translation information and a hit/miss indication (e.g., translation information 425 and hit signal 452 of FIG. 7) to the LSU. The LSU examines the hit/miss indication and the translation information. Operation proceeds to decision block 804.

At decision block 804, if the load/store address misses in the PTDCM, operation proceeds to decision block 812; otherwise, operation proceeds to decision block 805.

At decision block 805, if the translation information indicates a bad translation condition or if there is a permission violation, e.g., user, write or read permission violation, operation proceeds to block 808; otherwise, operation proceeds to block 806.

At block 806, the LSU processes the load/store operation normally. That is, if the load/store operation causes a need to generate an exception (i.e., other than due to a bad translation condition which is handled via block 816), the LSU signals a request for an abort (e.g., via abort signal 487 of FIG. 7), and in response control logic (e.g., pipeline control logic 132 of FIG. 1) raises an architectural exception (assuming the abort request is the highest priority request). Otherwise, the LSU outputs the requested data from the cache line of the hit upon entry onto its result bus in the case of a load operation, and in the case of a store operation, the LSU writes the store data to the entry in the store queue (e.g., store queue 125 of FIG. 1) allocated for the store operation.

At block 808, the LSU signals a request for an abort, and in response control logic raises an architectural exception. In one embodiment, the architectural exception is a page fault. Additionally, in the case of a load operation, the LSU outputs random data to its result bus (e.g., random data 499 generated by the RNG 483 of FIG. 4). Alternatively, in the case of a store operation, the LSU writes random data (e.g., random data 499 generated by the RNG 483 of FIG. 4) to the entry in the store queue allocated for the store operation, which may be helpful in mitigating side channel attacks that attempt to capitalize on speculative store-to-load forwarding.

At decision block 812, if the translation information indicates a bad translation condition or if there is a permission violation, e.g., user, write or read permission violation, operation proceeds to block 816; otherwise, operation proceeds to block 814.

At block 814, the LSU generates a fill request (e.g., fill request 433 of FIG. 7) that specifies the physical load/store address and that is sent to an L2 cache (e.g., L2 cache 107 of FIG. 6). Operation proceeds to block 806.

At block 816, the LSU does not generate a fill request. As a result, cache line data is not filled into the PTDCM nor any other level of the cache hierarchy of the processor. Instead, the LSU signals a request for an abort, and in response control logic raises an architectural exception (e.g., page fault or access fault). Advantageously, preventing cache line data from being filled into the PTDCM and all further levels of the cache hierarchy may be helpful in mitigating a side channel attack. Additionally, in the case of a load operation, the LSU outputs random data to its result bus (e.g., random data 499 generated by the RNG 483 of FIG. 4). Alternatively, in the case of a store operation, the LSU writes random data (e.g., random data 499 generated by the RNG 483 of FIG. 4) to the entry in the store queue allocated for the store operation, which may be helpful in mitigating side channel attacks that attempt to capitalize on speculative store-to-load forwarding. In one embodiment, the LSU generates the fill request and then subsequently cancels the fill request once it detects the bad translation condition before the cache line data can be filled into the PTDCM.

Figure 9:
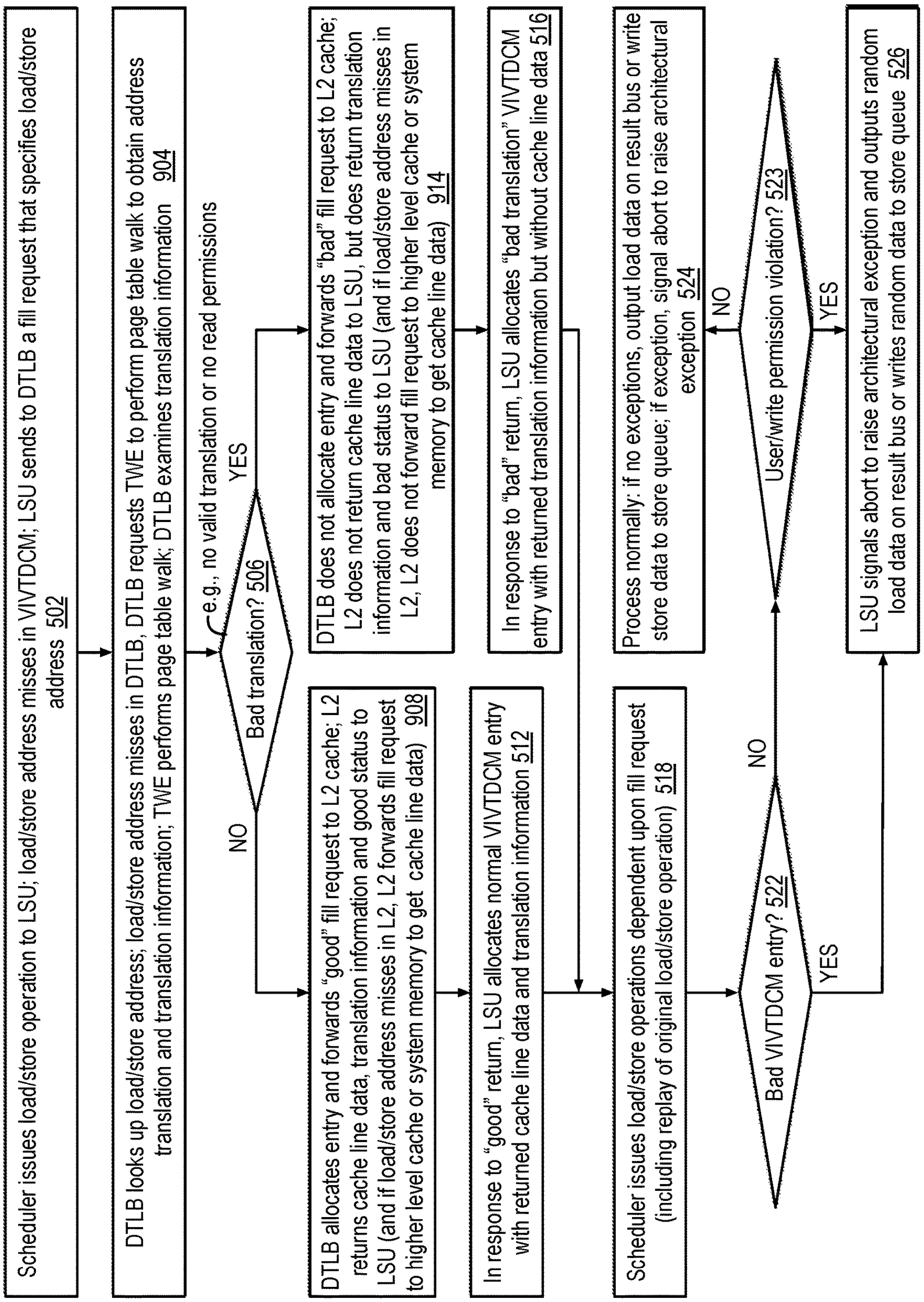
FIG. 9 is an example flowchart illustrating operation of a memory subsystem that includes a virtually-indexed, virtually-tagged data cache memory of a processor to mitigate side channel attacks according to embodiments of the present disclosure.

FIG. 9 is an example flowchart illustrating operation of a memory subsystem that includes a virtually-indexed, virtually-tagged data cache memory (e.g., memory subsystem 200 of FIG. 2) of a processor to mitigate side channel attacks according to embodiments of the present disclosure. The operation described in the embodiment of FIG. 9 is similar in many respects to the embodiment of FIG. 5 and like operations are numbered the same. However, block 504 is replaced by block 904, block 508 is replaced by block 908, and block 514 is replaced by block 914. The operation described in FIG. 9 is intended to illustrate an embodiment in which the memory subsystem refrains from allocating an entry in the DTLB for a missing load address in response detecting a bad translation condition.

The operation at block 904 is similar to the operation at block 504 of FIG. 5. However, in the embodiment of FIG. 9, it is assumed at block 904 that the load/store address misses in the DTLB and that the TWE performs a page table walk to obtain the translation. Thus, the DTLB examines the translation information provided by the TWE and makes the good/bad translation condition determination at decision block 506 before and without allocating an entry in response to the miss.

The operation at block 908 is similar to the operation at block 508 of FIG. 5 in the case of a good translation except in block 908 it is explicitly stated that the DTLB allocates an entry for the missing load/store address detected at block 904, which is implied in block 504 in the case of a DTLB miss at block 504 of FIG. 5.

The operation at block 914 is similar to the operation at block 514 of FIG. 5 in the case of a bad translation condition. However, in the embodiment of FIG. 9, at block 914 the DTLB does not allocate an entry. The fact that the DTLB 141 refrains from allocating an entry in the case of a bad translation condition may be helpful in mitigating a side channel attack. More specifically, it may be helpful in mitigating an SCA that recognizes through speculative execution which address a TLB miss occurred to in order to infer the value of secret data. As may be noted from the description of FIG. 9, the memory subsystem completes execution of the load operation that specifies the load address that hits in the VIVTDCM irrespective of whether the translation information is present or absent in the DTLB by completing execution of the load operation without accessing the DTLB.

Figure 10:
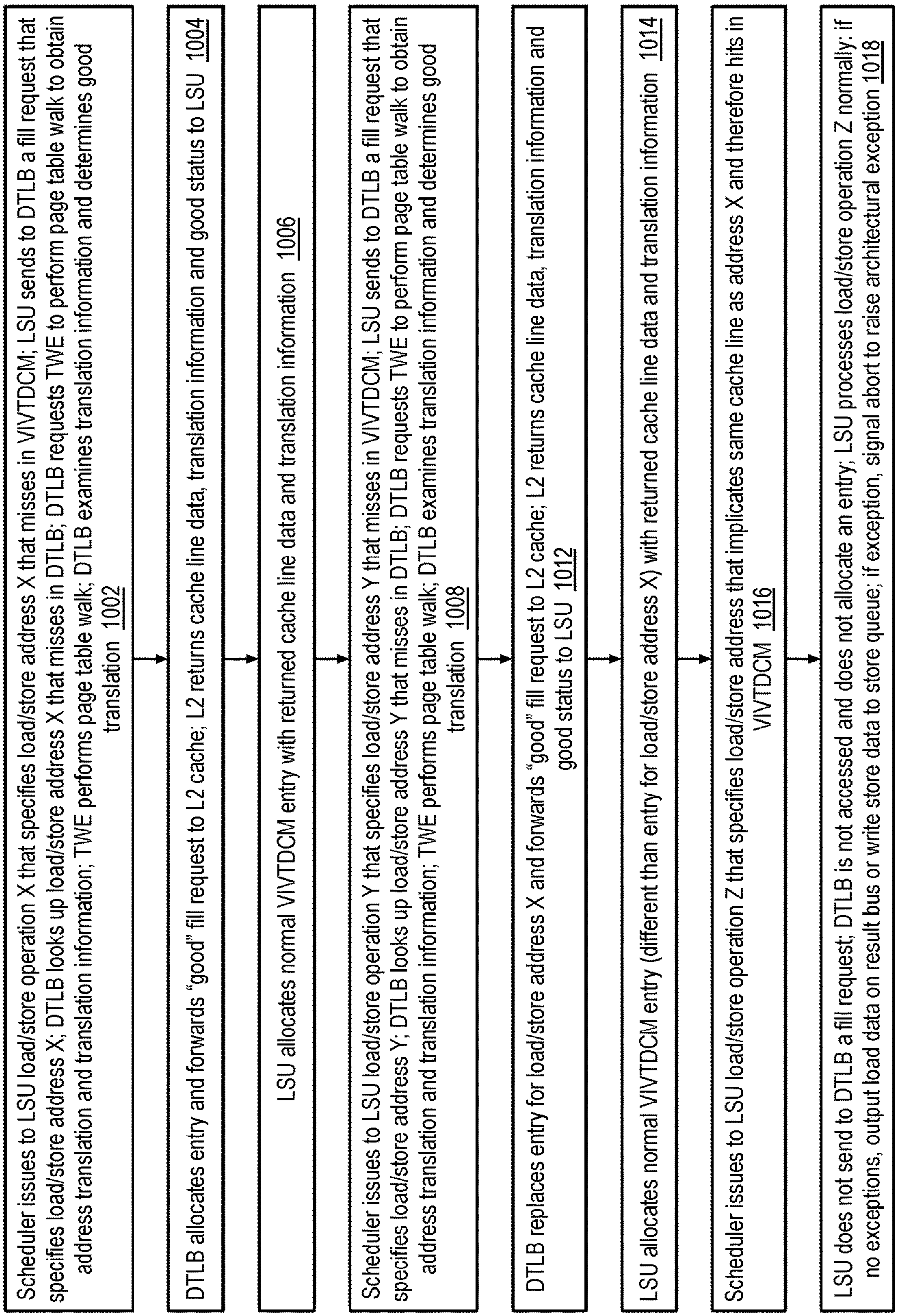
FIG. 10 is an example flowchart illustrating operation of a memory subsystem that includes a virtually-indexed, virtually-tagged data cache memory of a processor to mitigate side channel attacks according to embodiments of the present disclosure.
Figure 11:
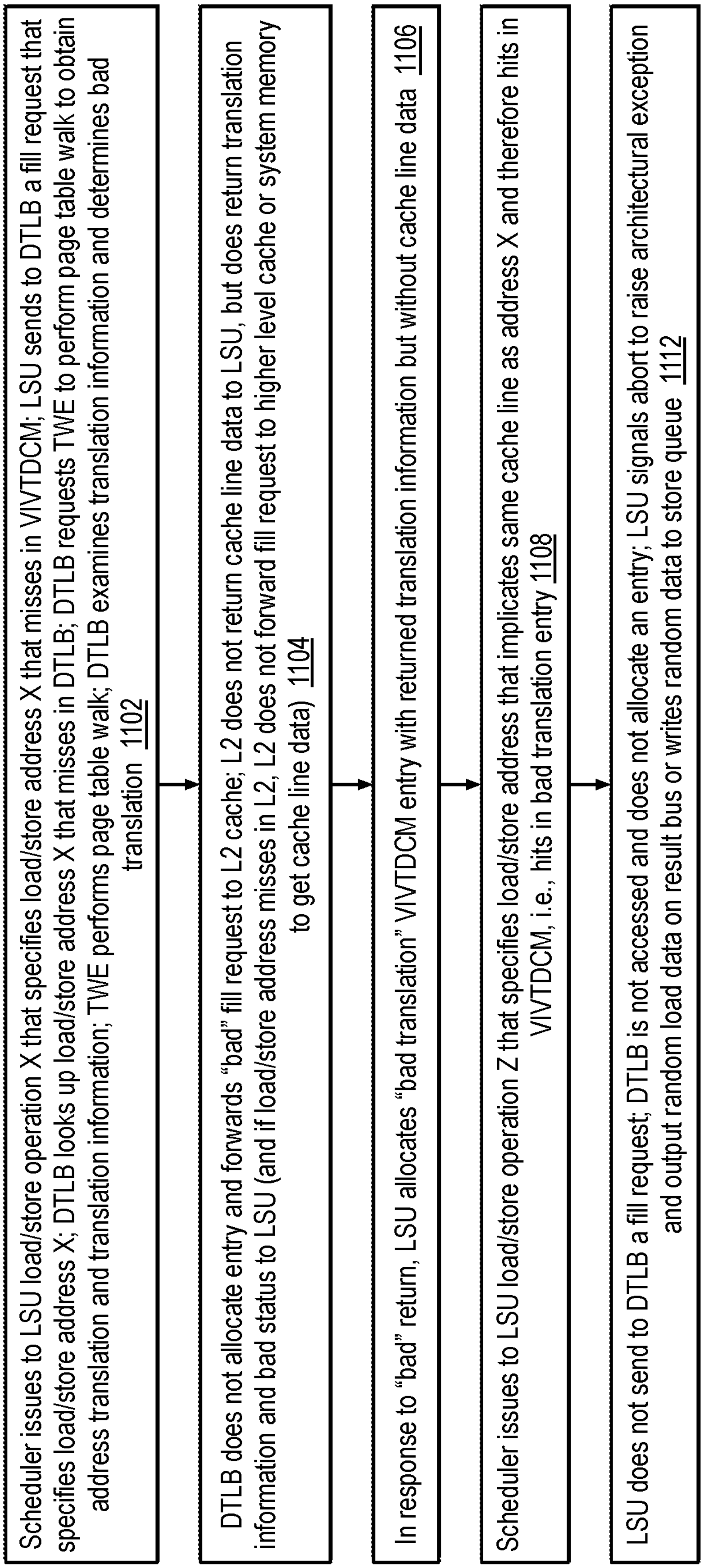
FIG. 11 is an example flowchart illustrating operation of a memory subsystem that includes a virtually-indexed, virtually-tagged data cache memory of a processor to mitigate side channel attacks according to embodiments of the present disclosure.

FIG. 10 is an example flowchart illustrating operation of a memory subsystem that includes a virtually-indexed, virtually-tagged data cache memory (e.g., memory subsystem 200 of FIG. 2) of a processor to mitigate side channel attacks according to embodiments of the present disclosure. FIG. 10 describes an aspect of the memory subsystem 200 of FIG. 2 in which inclusion is not maintained between the VIVTDCM 103 and the DTLB 141 with respect to translation information such that there are instances in time where the translation information for a load/store address is present in the VIVTDCM 103 but absent in the DTLB 141. FIG. 10 describes a first sequence of events which causes inclusion to not be maintained between the VIVTDCM 103 and the DTLB 141 such that there are instances in time where the translation information for a load/store address is present in the VIVTDCM 103 but absent in the DTLB 141. FIG. 11 describes a second sequence of events which causes inclusion to not be maintained between the VIVTDCM 103 and the DTLB 141 such that there are instances in time where the translation information for a load/store address is present in the VIVTDCM 103 but absent in the DTLB 141. The operation of FIGS. 10 and 11 should be understood in conjunction with operation of the memory subsystem 200 described in FIGS. 5 and 9. Operation begins at block 1002.

At block 1002, the scheduler issues to the LSU a first load/store operation, referred to here as load/store operation X, that specifies a load/store address X that misses in the VIVTDCM. The LSU sends to the DTLB a fill request that specifies load/store address X. The DTLB looks up load/store address X which misses in DTLB. The DTLB requests the TWE to a perform page table walk to obtain the address translation and translation information for load/store address X. The TWE performs the page table walk and provides the translation information to the DTLB. The DTLB examines the translation information and determines that there is a good translation for load/store address X. The operation at block 1002 is similar to the operation described above with respect to blocks 502, 904 and 506 of FIG. 9. Operation proceeds to block 104.

At block 1004, the DTLB allocates an entry for load/store address X and forwards a "good" fill request to the L2 cache. The L2 cache returns to the LSU the cache line data and translation information for load/store address X along with good status. The operation at block 1004 is similar to the operation described above with respect to block 908 of FIG. 9. Operation proceeds to block 1006.

At block 1006, the LSU allocates a normal VIVTDCM entry with the returned cache line data and translation information. The operation at block 1006 is similar the operation described above with respect to block 1006 of FIG. 9. Operation proceeds to block 1008.

At block 1008, the same operations are performed by the memory subsystem 200 as at block 1002, except they are performed for a subsequent load/store operation Y, i.e., subsequent to load/store operation X, that specifies a load/store address Y that, in the example of FIG. 10, implicates a different cache line from the cache line implicated by load/store address X. Operation proceeds to block 1012.

At block 1012, the DTLB replaces the entry for load/store address X that was allocated at block 1004. That is, in the example instance of FIG. 10, load/store address X and load/store address Y map to the same set in the DTLB, and the DTLB replacement algorithm selects for replacement the entry that was allocated to load/store address X at block 1004. The DTLB also forwards a "good" fill request to L2 cache. The L2 cache returns to the LSU the cache line data and translation information for load/store address X along with good status. Thus, an instance in time is caused by the sequence of events of blocks 1002 through 1012 of FIG. 10 in which inclusion between the VIVTDCM and the DTLB with respect to translation information is not maintained such that translation information for load/store address X is present in the VIVTDCM and absent in the DTLB. Operation proceeds to block 1014.

At block 1014, the LSU allocates a normal VIVTDCM entry with the returned cache line data and translation information. In the example instance of FIG. 10, the allocated entry is a different entry than the entry allocated for load/store address X at block 1006. Operation proceeds to block 1016.

At block 1016, the same operations are performed by the memory subsystem 200 as at block 1002, except they are performed for a subsequent load/store operation Z, i.e., subsequent to load/store operations X and Y, that, in the example of FIG. 10, specifies a load/store address the implicates the same cache line implicated by load/store operation X issued at block 1002 and therefore hits on the entry allocated at block 1006. Operation proceeds to block 1018.

At block 1018, the LSU does not send a fill request to the DTLB. Thus, the DTLB is not accessed and does not allocate an entry. The LSU completes execution of load/store operation Z normally. That is, if no exceptions are needed, the LSU outputs load data on result bus or writes store data to the store queue; whereas, if there is an exception needed, the LSU signals an abort to raise architectural exception. Thus, advantageously, the DTLB is not accessed. Consequently, a miss in the DTLB may be avoided that might otherwise be detectable by a side channel attack in an instance in time in which inclusion between the VIVTDCM and the DTLB with respect to translation information is not maintained such that translation information for a load/store address is present in the VIVTDCM and absent in the DTLB, such as was created by the sequence of events of blocks 1002 through 1012. The operation at block 1018 is similar to the operation at block 524 of FIG. 9.

FIG. 11 is an example flowchart illustrating operation of a memory subsystem that includes a virtually-indexed, virtually-tagged data cache memory (e.g., memory subsystem 200 of FIG. 2) of a processor to mitigate side channel attacks according to embodiments of the present disclosure. As described above, FIG. 11 describes a second sequence of events which causes inclusion to not be maintained between the VIVTDCM 103 and the DTLB 141 such that there are instances in time where the translation information for a load/store address is present in the VIVTDCM 103 but absent in the DTLB 141. Operation begins at block 1102.

At block 1102, the same operations are performed by the memory subsystem 200 as at block 1002, except the DTLB determines that there is a bad translation for load/store address X. Operation proceeds to block 1104.

At block 1104, the DTLB, in response to detecting a bad translation, does not allocate an entry and forwards a "bad" fill request to the L2 cache. The L2 cache does not return cache line data to the LSU but does return translation information and bad status. The operation at block 1104 is similar to the operation described above with respect to block 914 of FIG. 9. Operation proceeds to block 1106.

At block 1106, in response to the "bad" fill request return, the LSU allocates a "bad translation" entry in the VIVTDCM with the returned translation information but without cache line data. The operation at block 1106 is similar to the operation described above with respect to block 516 of FIG. 9. Thus, an instance in time is caused by the sequence of events of blocks 1102 through 1106 of FIG. 11 in which inclusion between the VIVTDCM and the DTLB with respect to translation information is not maintained such that translation information for load/store address X is present in the VIVTDCM and absent in the DTLB. Operation proceeds to block 1108.

At block 1108, the scheduler issues to the LSU a load/store operation Z that specifies load/store address that implicates the cache line implicated by address X and therefore hits in the entry of the VIVTDCM that was allocated at block 1106. That is, load/store operation Z hits in the bad translation entry allocated at block 1106. Operation proceeds to block 1112.

At block 1112, the LSU does not send a fill request to the DTLB. Thus, the DTLB is not accessed and does not allocate an entry. The LSU signals an abort to raise an architectural exception and outputs random load data on the result bus or writes random data to the store queue. That is, the LSU completes execution of load/store operation Z by signaling an abort to generate an architectural exception. Thus, advantageously, the DTLB is not accessed. Consequently, a miss in the DTLB may be avoided that might otherwise be detectable by a side channel attack in an instance in time in which inclusion between the VIVTDCM and the DTLB with respect to translation information is not maintained such that translation information for a load/store address is present in the VIVTDCM and absent in the DTLB, such as was created by the sequence of events of blocks 1102 through 1106.

Figure 12:
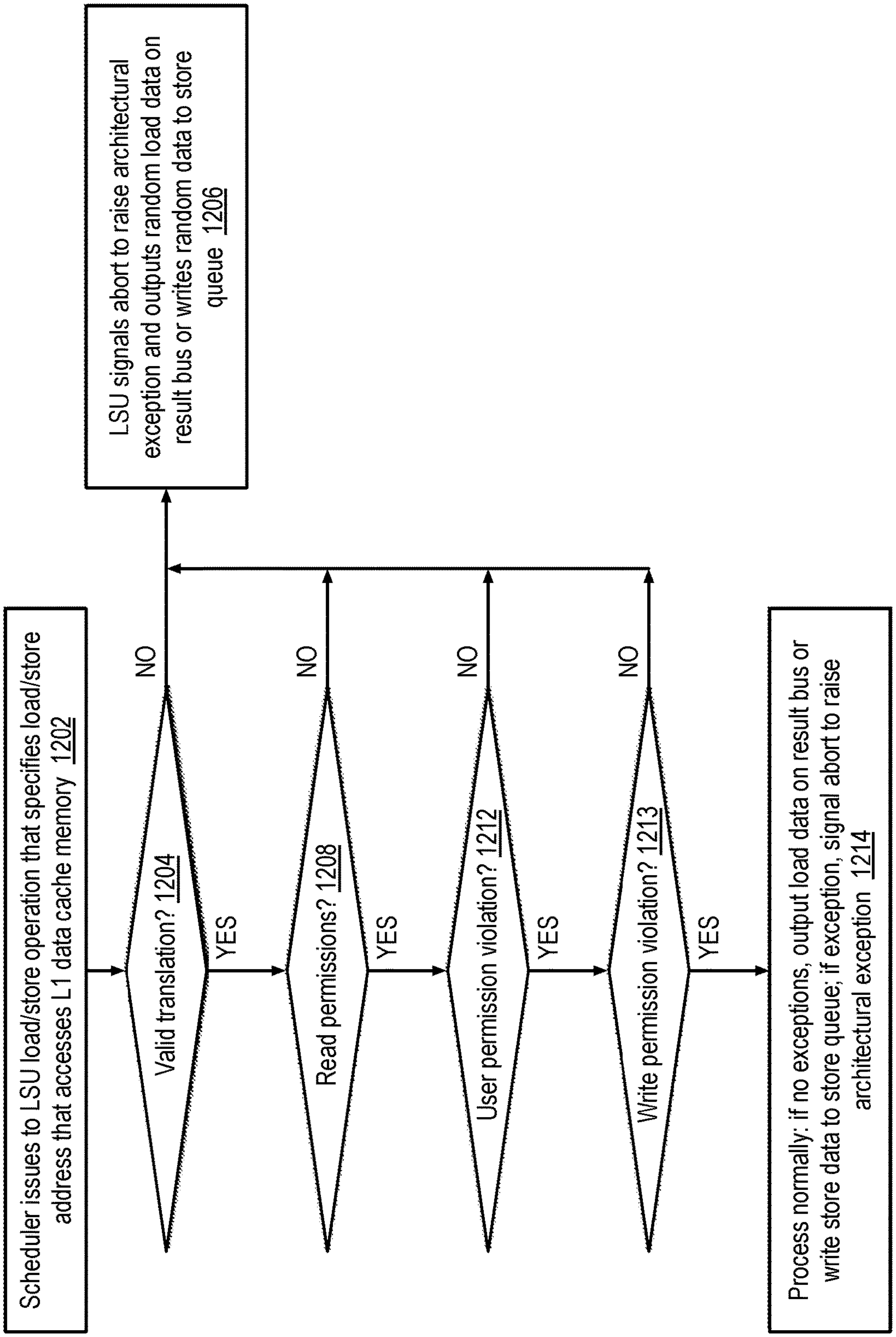
FIG. 12 is an example flowchart illustrating operation of a memory subsystem of a processor that mitigates side channel attacks according to embodiments of the present disclosure.

FIG. 12 is an example flowchart illustrating operation of a memory subsystem (e.g., memory subsystem 200 of FIG. 2 or memory subsystem 600 of FIG. 6) of a processor that mitigates side channel attacks according to embodiments of the present disclosure. Operation begins at block 1202.

At block 1202, the scheduler issues to the LSU a load/store operation that specifies a load/store address that accesses a level-1 data cache memory (e.g., VIVTDCM 103 of FIG. 2 or PTDCM 103 of FIG. 6). In the embodiment of FIG. 6, the load/store operation also accesses the L1 DTLB to obtain the translation information. In the embodiment of FIG. 2, in the case of a miss in the VIVTDCM, the load/store operation also accesses the DTLB to obtain the translation information. Operation proceeds to decision block 1204.

At decision block 1204, if the load/store address specifies a location for which a valid address translation does not currently exist, operation proceeds to block 1206; otherwise, operation proceeds to decision block 1208.

At block 1206, the LSU signals an abort to raise an architectural exception and outputs random load data on its result bus or writes random data to the store queue similar to the operation at block 526. In one embodiment, the architectural exception is a page fault.

At decision block 1208, if permission to read from the load/store address is not allowed, operation proceeds to block 1206; otherwise, operation proceeds to decision block 1212.

At decision block 1212, if the load/store operation does not have permission to access the load/store address because permission to access from the load/store address is not allowed by a process running at user privilege level, operation proceeds to block 1206; otherwise, operation proceeds to decision block 1213.

At decision block 1213, if the load/store operation is a store operation and permission to write to the store address is not allowed, operation proceeds to block 1206; otherwise, operation proceeds to block 1214.

At block 1214, the LSU processes the load/store operation normally. That is, if the load/store operation causes a need to generate an exception (i.e., other than due to the conditions detected at decision blocks 1204, 1208 and 1212), the LSU signals a request for an abort, and in response control logic raises an architectural exception. Otherwise, the LSU outputs the requested data from the cache line of the hit upon entry onto its result bus in the case of a load operation, and in the case of a store operation, the LSU writes the store data to the entry in the store queue allocated for the store operation.

Figure 13:
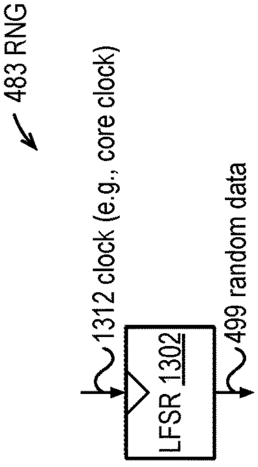
FIGS. 13 through 17 are examples of a RNG according to embodiments of the present disclosure.
Figure 14:
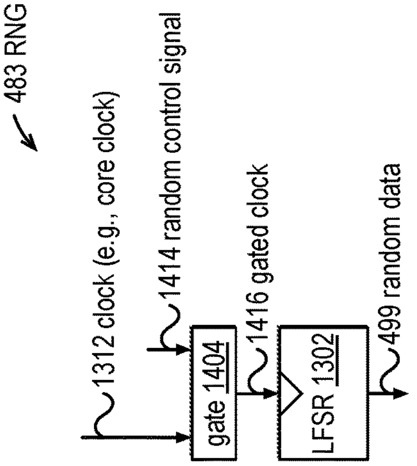
Figure 15:
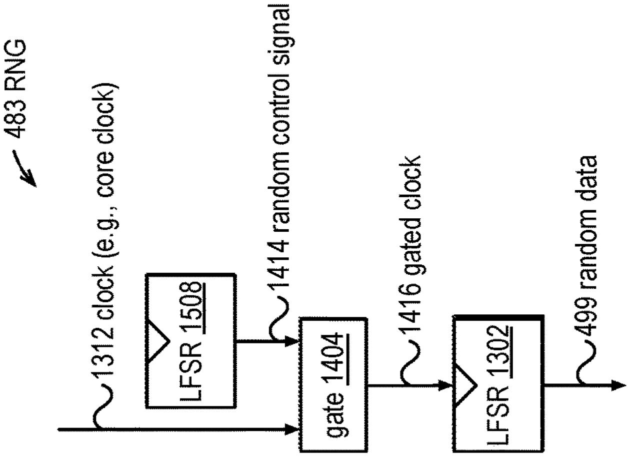
Figure 16:
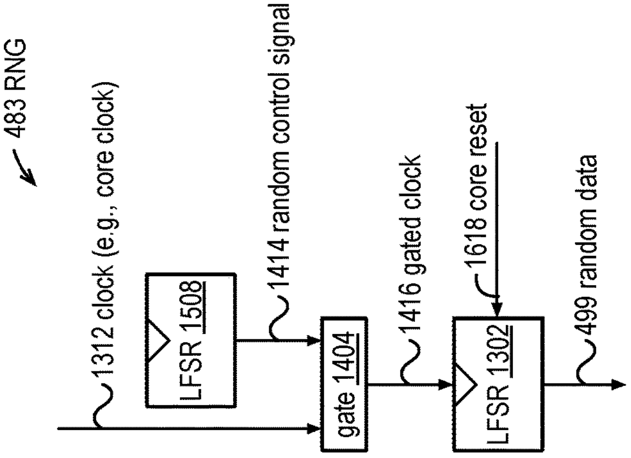
Figure 17:
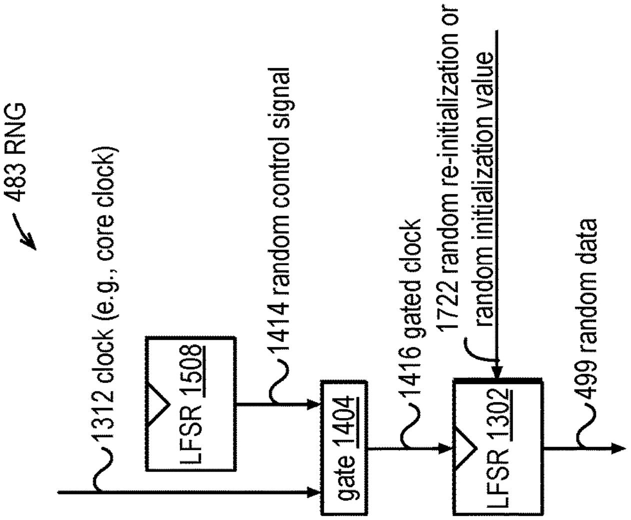

FIGS. 13 through 17 are examples of a RNG (e.g., RNG 483 of FIGS. 4 and 7) according to embodiments of the present disclosure. In the embodiment of FIG. 13, the RNG 483 comprises a linear feedback shift register (LFSR) 1302 that generates random data 499 and that is clocked with a clock 1312, such as a clock signal of the core 100 that controls most of the logic of the core 100, such as shown in FIG. 1, or another clock, e.g., an input/output bus clock signal or a clock signal generated specifically for the LFSR 1302. In one embodiment, the LFSR 1302 generates 64-bit random data 499 per clock cycle of the clock 1312. In the embodiment of FIG. 14, the LFSR 1302 is clocked by a randomly clock signal 1416 that is the output of a gate 1404 (e.g., Boolean logic) that receives the clock signal 1312 and a random control signal 1414. The random control signal 1414 may be, for example, the output of a TRNG. In the embodiment of FIG. 15, the random control signal 1414 is the output of a second LFSR 1508 that receives a clock signal (not shown). In one embodiment, the LFSR 1302 is initialized in response to a reset 1618 of the core 100, as shown in FIG. 16. In one embodiment, the LFSR 1302 is re-initialized during operation of the microprocessor after one or more random intervals, e.g., via a random initialization input 1722, such as shown in FIG. 17, e.g., triggered by the detection of one or more predetermined values on the output of a TRNG or another LFSR. In one embodiment, the LFSR 1302 is re-initialized during operation of the core 100 with a random initialization value 1722, such as shown in FIG. 17, e.g., provided by the output of a TRNG or another LFSR.

Although embodiments are shown in which the memory subsystem includes a single RNG, other embodiments are contemplated that include an RNG for each LSU pipeline, since each LSU pipeline could encounter a bad load/store operation in the same clock cycle. LFSR embodiments such as those of FIGS. 13 through 17, for example, may be able to generate new random data 499 for each different load/store operation, e.g., at the core clock rate. However, it may be difficult for a TRNG embodiment to generate true random data at that rate. However, in the case of a bad load/store operation (i.e., a load/store operation for which the LSU outputs random data provided by the TRNG or writes the random data to the store queue), an exception will be raised, and an exception handler will run. As a result, even if the attacking code is able to execute multiple bad loads/stores in close proximity requiring a burst of multiple random data 499, the average rate at which the TRNG will be required to provide true random data in between exceptions may be significantly lower than the TRNG's true random data production rate. Embodiments are contemplated in which the TRNG includes a queue/buffer that stores up large amounts of true random data during stretches of time when no bad loads/stores are executed such that the TRNG can supply the burst of true random data at the needed average rate.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A microprocessor for mitigating side channel attacks, comprising:

a memory subsystem configured to receive a load operation that specifies a load address, the memory subsystem comprising:

a virtually-indexed, virtually-tagged data cache memory (VIVTDCM) comprising entries that hold translation information, wherein the translation information of each entry comprises information that is used to determine whether permission to read from a physical memory page associated with the entry is allowed; and a data translation lookaside buffer (DTLB) comprising entries that hold physical address translations and the translation information;

wherein the microprocessor is configured to perform speculative execution of instructions;

wherein the microprocessor is configured to execute instructions out of program order;

wherein the memory subsystem is configured to allow non-inclusion with respect to the translation information between the VIVTDCM and any translation lookaside buffer (TLB) including the DTLB such that, for instances in time, the translation information associated with the load address is present in the VIVTDCM and absent in all TLBs including the DTLB;

wherein the memory subsystem is configured to use the translation information of the VIVTDCM to complete execution of the load operation when the load address hits in the VIVTDCM irrespective of whether even when the translation information is present or absent in all TLBs including the DTLB; wherein the translation information further comprises memory access attributes used to determine whether the physical memory page is uncacheable; and wherein an instance in time of the instances in time in which the translation information associated with the load address is present in the VIVTDCM and absent in the DTLB is causable by a sequence of events in which:

an entry is allocated into the DTLB during execution of a prior load operation executed prior to the load operation, wherein the prior load operation implicates a same cache line as the load address specified by the load operation:

an entry is allocated into the VIVTDCM during execution of the prior load operation; and subsequently the entry allocated into the DTLB during execution of the prior load operation is replaced during execution of an intermediate load or store operation executed intermediate the prior load operation and the load operation, wherein the intermediate load or store operation specifies a second load address different from the load address specified by the load operation.

2. The microprocessor of claim 1, wherein an instance in time of the instances in time in which the translation information associated with the load address is present in the VIVTDCM and absent in the DTLB is causable by a sequence of events in which:

the memory subsystem generates a cache line fill request in response to a miss of the load address in the VIVTDCM during execution of the prior load operation executed prior to the load operation, wherein the prior load operation implicates a same cache line as the load address specified by the load operation;

the memory subsystem performs a page table walk in response to a miss of the load address in the DTLB during execution of the prior load operation;

the page table walk indicates a condition in which the load address specifies a memory location for which a valid address translation does not currently exist or permission to read from the memory location is not allowed; and the memory subsystem, in response to the condition indicated by the page table walk:

allocates an entry in the VIVTDCM; and refrains from allocating an entry in the DTLB.

3. The microprocessor of claim 2, wherein the entry allocated in the VIVTDCM indicates that the entry allocated in the VIVTDCM is without valid data.

4. The microprocessor of claim 2, wherein the entry allocated in the VIVTDCM specifies a type of architectural exception to be raised by the microprocessor in response to execution of the load operation.

5. The microprocessor of claim 1, wherein the DTLB and any additional TLBs are at a same level.

6. A method for mitigating side channel attacks, comprising:

allowing, by a memory subsystem, non-inclusion with respect to the translation information between a virtually-indexed, virtually-tagged data cache memory (VIVTDCM) and any translation lookaside buffer (TLB) including a data translation lookaside buffer (DTLB) such that the translation information associated with the load address is present in the VIVTDCM and absent in all TLBs including the DTLB, wherein the translation information comprises memory access attributes; and using, by the memory subsystem, the translation information of the VIVTDCM to complete execution of a load operation when a load address hits in the VIVTDCM even when the translation information is absent in all TLBs including the DTLB;

using the memory access attributes to determine whether a physical memory page is uncacheable;

allocating an entry into the DTLB during execution of a prior load operation executed prior to the load operation, wherein the prior load operation implicates a same cache line as the load address specified by the load operation;

allocating an entry into the VIVTDCM during execution of the prior load operation; and subsequently replacing the entry allocated into the DTLB during execution of an intermediate load or store operation executed intermediate the prior load operation and the load operation, wherein the intermediate load or store operation specifies a second load address different from the load address specified by the load operation and further wherein replacing the entry allocated into the DTLB results in the translation information associated with the load address being present in the VIVTDCM and absent in the DTLB.

7. The method of claim 6, wherein an instance in time in which the translation information associated with the load address is present in the VIVTDCM and absent in the DTLB is causable by a sequence of events in which:

the memory subsystem generates a cache line fill request in response to a miss of the load address in the VIVTDCM during execution of the prior load operation executed prior to the load operation, wherein the prior load operation implicates a same cache line as the load address specified by the load operation;

the memory subsystem performs a page table walk in response to a miss of the load address in the DTLB during execution of the prior load operation;

the page table walk indicates a condition in which the load address specifies a memory location for which a valid address translation does not currently exist or permission to read from the memory location is not allowed; and the memory subsystem, in response to the condition indicated by the page table walk:

allocates an entry in the VIVTDCM; and refrains from allocating an entry in the DTLB.

8. The method of claim 7, wherein the entry allocated in the VIVTDCM indicates that the entry allocated in the VIVTDCM is without valid data.

9. The method of claim 7, wherein the entry allocated in the VIVTDCM specifies a type of architectural exception to be raised by the microprocessor in response to execution of the load operation.

10. The method of claim 6, wherein the DTLB and any additional TLBs are at a same level.

11. A non-transitory computer-readable medium having instructions stored thereon that are capable of causing or configuring a microprocessor for mitigating side channel attacks comprising:

a memory subsystem configured to receive a load operation that specifies a load address, the memory subsystem comprising:

a virtually-indexed, virtually-tagged data cache memory (VIVTDCM) comprising entries that hold translation information, wherein the translation information of each entry comprises information that is used to determine whether permission to read from a physical memory page associated with the entry is allowed; and a data translation lookaside buffer (DTLB) comprising entries that hold physical address translations and the translation information;

wherein the microprocessor is configured to perform speculative execution of instructions;

wherein the microprocessor is configured to execute instructions out of program order;

wherein the memory system is configured to allow non-inclusion with respect to the translation information between the VIVTDCM and any translation lookaside buffer (TLB) including the DTLB such that, for instances in time, the translation information associated with the load address is present in the VIVTDCM and absent in all TLBs including the DTLB;

wherein the memory subsystem is configured to use the translation information of the VIVTDCM to complete execution of the load operation when the load address hits in the VIVTDCM even when the translation information is absent in all TLBs including the DTLB; and wherein an instance in time of the instances in time in which the translation information associated with the load address is present in the VIVTDCM and absent in the DTLB is causable by a sequence of events in which:

an entry is allocated into the DTLB during execution of a prior load operation executed prior to the load operation, wherein the prior load operation implicates a same cache line as the load address specified by the load operation;

an entry is allocated into the VIVTDCM during execution of the prior load operation, and subsequently the entry allocated into the DTLB during execution of the prior load operation is replaced during execution of an intermediate load or store operation executed intermediate the prior load operation and the load operation, wherein the intermediate load or store operation specifies a load address different from the load address specified by the load operation.

12. The non-transitory computer-readable medium of claim 11, wherein the translation information further comprises memory access attributes used to determine whether the physical memory page is uncacheable.

13. The non-transitory computer-readable medium of claim 11, wherein an instance in time of the instances in time in which the translation information associated with the load address is present in the VIVTDCM and absent in the DTLB is causable by a sequence of events in which:

the memory subsystem generates a cache line fill request in response to a miss of the load address in the VIVTDCM during execution of the prior load operation executed prior to the load operation, wherein the prior load operation implicates a same cache line as the load address specified by the load operation;

the memory subsystem performs a page table walk in response to a miss of the load address in the DTLB during execution of the prior load operation;

the page table walk indicates a condition in which the load address specifies a memory location for which a valid address translation does not currently exist or permission to read from the memory location is not allowed; and the memory subsystem, in response to the condition indicated by the page table walk:

allocates an entry in the VIVTDCM; and refrains from allocating an entry in the DTLB.

14. The non-transitory computer-readable medium of claim 13, wherein the entry allocated in the VIVTDCM allocated in the VIVTDCM indicates that the entry is without valid data.

15. The non-transitory computer-readable medium of claim 13, wherein the entry allocated in the VIVTDCM specifies a type of architectural exception to be raised by the microprocessor in response to execution of the load operation.

16. The non-transitory computer-readable medium of claim 11, wherein the DTLB and any additional TLBs are at a same level.

* * * * *